United States Patent [19]

Sasaki et al.

[11] Patent Number: 4,827,298
[45] Date of Patent: May 2, 1989

[54] PHOTOGRAPHIC LIGHT-SENSITIVE MATERIAL-PACKED UNIT HAVING EXPOSURE FUNCTION

[75] Inventors: Noboru Sasaki; Keisuke Shiba, both of Kanagawa, Japan

[73] Assignee: Fuji Photo Film Co., Ltd., Kanagawa, Japan

[21] Appl. No.: 154,242

[22] Filed: Feb. 9, 1988

[30] Foreign Application Priority Data

Feb. 9, 1987 [JP] Japan .................................. 62-27652

[51] Int. Cl.⁴ .............................................. G03B 17/08
[52] U.S. Cl. ..................................... 354/288; 354/64; 354/202
[58] Field of Search ................ 354/64, 202, 275, 288, 354/203; 430/939

[56] References Cited

U.S. PATENT DOCUMENTS

| | | | |
|---|---|---|---|
| 3,502,013 | 3/1970 | Shimoda | 354/288 |
| 4,033,392 | 7/1977 | Less | 354/64 |
| 4,680,248 | 7/1987 | Roach | 430/939 |
| 4,766,451 | 8/1988 | Fujimura et al. | 354/288 |

*Primary Examiner*—A. A. Mathews
*Attorney, Agent, or Firm*—Sughrue, Mion, Zinn, Macpeak & Seas

[57] ABSTRACT

Disclosed is a multi-layer color photographic light-sensitive material-packed unit for picture-taking in the form of a lens-combined picture-taking unit having an exposure function. The invention is characterized in that the size of the picture plane of the light-sensitive material in the unit is 3.0 cm² or more, that the packed unit is further packaged with a moisture-proof bag, that the relative humidity in said moisture-proof bag is 65% or less at 25° C. and that the absolute value of the curling of the said light-sensitive material is from −1 mm to +1.5 mm at the said relative humidity while the fluctuating value of the curling thereof is 1.5 mm or less. Also disclosed is multi-layer color photographic light-sensitive material-packed unit having the same photographic emulsion layer constitution and having the same photographic function, but which is characterized in that the unit body is made of a moisture-impermeable material and the parts of the body are constructed by thermal fusion so that the body may be moisture-impermeable.

Using the unit, images of high quality can be obtained even under high humidity conditions, and in addition, the unit can be stably stored for long periods and can give focused pictures even under high moisture conditions.

11 Claims, 3 Drawing Sheets

Fluctuation Value = (x−y)

PHOTOGRAPHIC LIGHT-SENSITIVE MATERIAL-PACKED UNIT HAVING EXPOSURE FUNCTION

FIELD OF THE INVENTION

The present invention relates to a photographic light-sensitive material-packed unit for picture-taking, which has an exposure function in the form of a lens-combined picture-taking unit.

BACKGROUND OF THE INVENTION

Consumers' needs for photographs are diversifying in these days, and cameras of high grade such as a single lens reflex camera of high grade with an automatic focusing function are being developed. On the other hand, a desire for pleasurably photographing more simply and more cheaply is also increasing. The "Utsurun-desu" in Japan (or "Quick Snap" in U.S.A.) developed and sold by Fuji Photo Film Co., Ltd. on July 1986 is a picture-taking unit having a simple photographic system in which a 110 format film is incorporated and packed in a packing unit. This packing unit can be directly used for picture-taking immediately after a user bought the unit. However, since the film in the unit is small-sized, the graininess of the enlarged print obtained therefrom is not sufficient, and the desire for improving the graininess of the enlarged print has to date been strong. In addition, another desire for using the lens-combined picture-taking unit even indoors has become strong in these days.

SUMMARY OF THE INVENTION

The first object of the present invention is to provide a photographic material-packed unit having a picture-taking function capable of obtaining an image of high quality.

The second object of the present invention is to provide a photographic material-packed unit having a picture-taking function, which affords excellent stability during storage for a long period of time and which can give in-focus pictures even under high humidity conditions.

The present inventors conducted intensive research in order to attain the above objects and as a result have found that although the enlargement of the film size would be most effective for preventing the roughness of the graininess, the sharpness could not be improved to the expected degree but would often be degraded because of the obscuration of the surrounding images and of other reasons in the case of a plastic single lens-combined film unit pack having a picture-taking function. In addition, it has also been found that the lens preferably has an F value larger than 4, most preferably between 8 and 16. Additionally, the film incorporated in the unit pack preferably has an ISO sensitivity of 250 or more, preferably 800 or more since the exposure would often become an under-exposure because of lens having such a high F value. Moreover, it has been known that such film in the unit pack is often deteriorated because of formalin or harmful gases such as sulfurous acid gas, etc. or moisture in atmosphere. Therefore, the necessity of the countermeasure for this deterioration has also been understood. For the countermeasure, one technique of packaging the lens-combined film unit pack in a moisture-proof bag so that no moisture may penetrate into the inside of the unit pack has been proposed in Japanese Utility Model Application (OPI) No. 186140/87 (The term "OPI" as used herein refers to a "published unexamined Japanese Utility Model or Patent Application open to public inspection"), Japanese Utility Model Application Nos. 100488/86 and 100489/86 (both of which corresponding to U.S. patent application Ser. No. 68,224, now U.S. Pat. No. 4,766,451) and Japanese Patent Application (OPI) 17448/88, etc. In general, the technique is also applied to commercial films so as to lower the moisture in the packaging case because of the above-mentioned reasons. The present inventors tried to apply the said technique to a lens-combined unit pack having a large-sized film as incorporated therein, and as a result unexpectedly found one problem as mentioned below, although the deterioration of the film by harmful gases or moisture was found to be prevented.

When the package of a lens-combined film unit pack as packaged with a moisture-proof bag and stored under the condition having a relative humidity of 65% or less at 25° C. is opened and the film unit is used for picture-taking in a high moisture place having a relative humidity of 70% or more, the focus point is noted to fluctuate at the initial frame of the picture-taking and the last frame. In this connection, when film as stored under a low humidity condition is set in a camera in the same high humidity environment and used for picture-taking in the same manner for the same period of time, the phenomenon of the fluctuation of the focus point does not occur. Therefore, it is believed that the phenomenon is a problem intrinsic to the pack unit itself. Under the situation, the present inventors intensively studied the problem and as a result found that the problem is caused by the fact that the combined lens and film pack unit is not hermetically sealed and therefore the humidity in the unit gradually varies so that the curling of the film also varies to cause the fluctuation of the focus point. In the case of conventional cameras, when the film is set in the camera, it is exposed to the ambient air and immediately becomes equilibrated thereto and, therefore, the problem hardly arises. In addition, it also has been found that conventional cameras are almost free from the problem since these have a precision film-holding plate. In the case of the lens-combined film unit pack, the fluctuation of the focus point caused by the curling is especially noticeable when the size of the picture plane of the film is 3.0 cm² or more. More specifically, the problem is significant in the case of 135 format or 126 format, while it is not practically so significant in the case of 110 format since the size of the picture plane is small and the influence of the curling of the film is small.

The above-mentioned objects of the present invention can be attained by the provision of a photographic light-sensitive material-packed unit for picture-taking, which comprises a photographic light-sensitive material having at least one cyan-coloring red-sensitive silver halide emulsion layer, at least one magenta coloring green-sensitive silver halide emulsion layer and at least one yellow-coloring blue-sensitive silver halide emulsion layer on a support, as incorporated into a lens-combined picture-taking unit having an exposure function. The unit of the invention is characterized in that the size of the picture plane of the said light-sensitive material is 3.0 cm² or more, that the packed unit is further packaged with a moisture-proof bag, that the relative humidity in the said moisture-proof bag is 65% or less at 25° C., and that the absolute value of the curling of the said light-sensitive material (which is specifically defined hereinafter) is from $-1$ mm to $+1.5$ mm while the fluctuation of the curling is 1.5 mm or less.

Alternatively, the objects of the present invention can also be attained by the provision of a photographic light-sensitive material-packed unit for picture-taking, which comprises a photographic light-sensitive material having at least one cyan-coloring red-sensitive silver halide emulsion layer, at least one magenta-coloring green-sensitive silver halide emulsion layer and at least one yellow-coloring blue-sensitive silver halide emulsion layer on a support, as incorporated into a lens-combined picture-taking unit having an exposure function. The unit is then characterized in that the size of the picture plane of the said light-sensitive material is 3.0 cm$^2$ or more, that the relative humidity in the said lens-combined unit pack is 65% or less at 25° C., that the absolute value of the curling of the said light-sensitive material is from $-1$ mm to $+1.5$ mm, and that the said lens-combined pack unit body is made of a moisture-impermeable material and the parts of the unit body are constructed by thermal fusion so that the body may be moisture-impermeable.

DETAILED DESCRIPTION OF THE INVENTION

Figure 1:
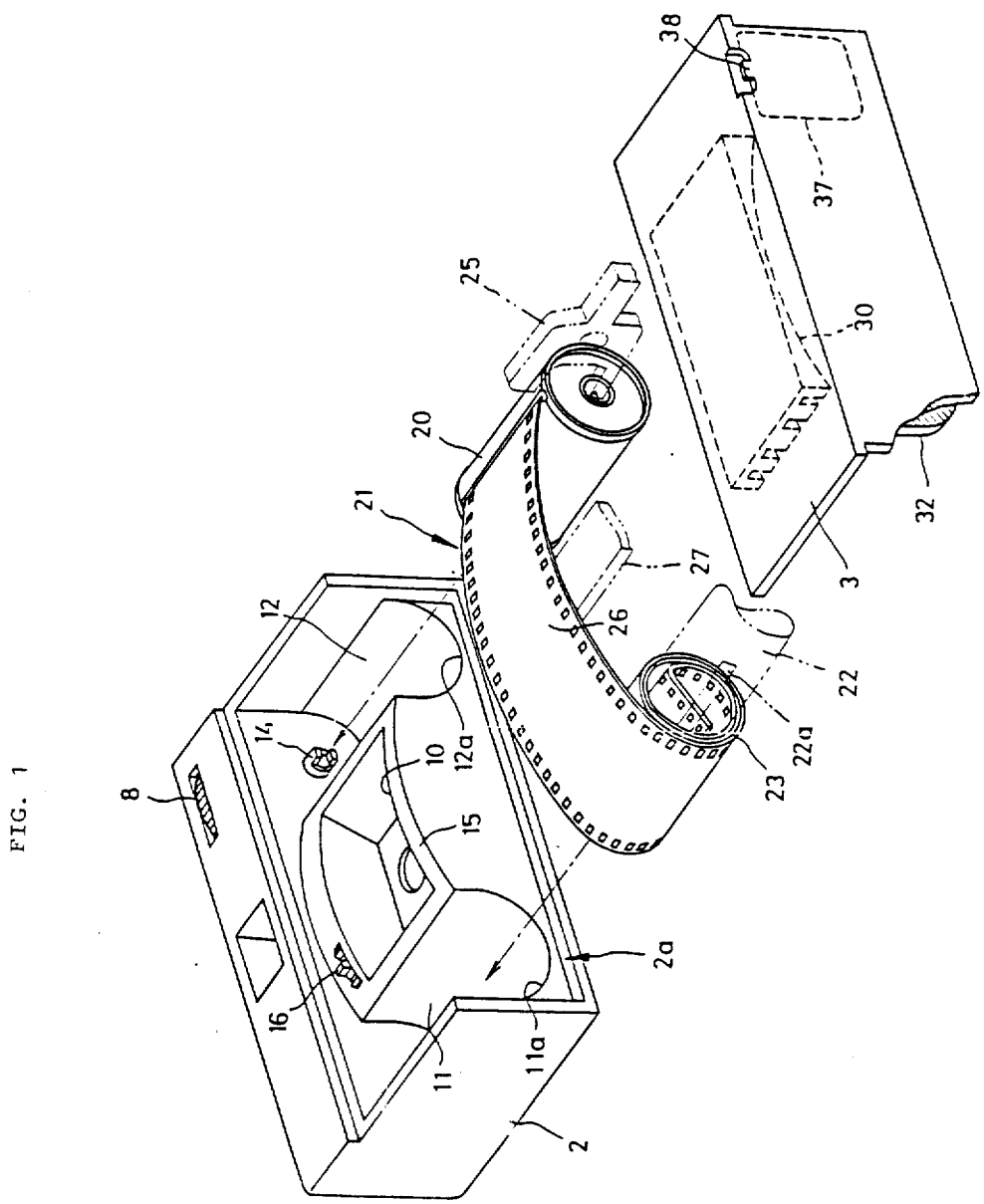
FIG. 1 is an oblique view showing one embodiment of the photographic light-sensitive material-packed unit of the present invention.
Figure 2:
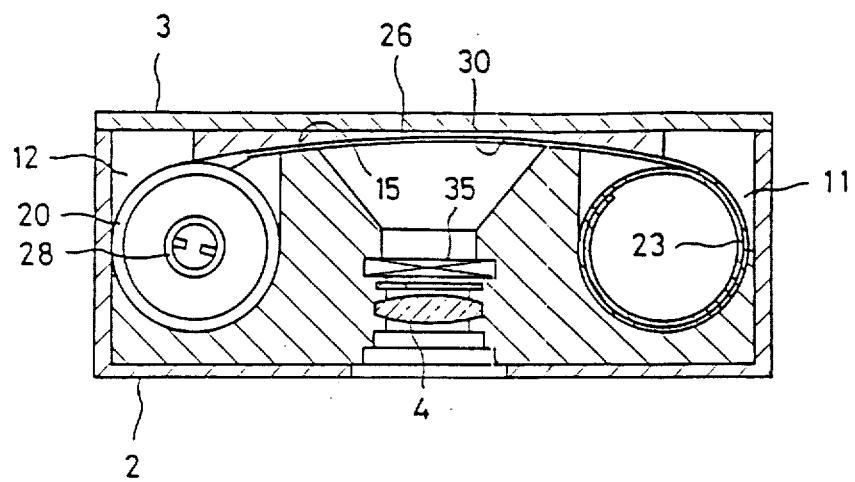
FIG. 2 is a sectional view of the essential part of the photographic light-sensitive material-packed unit of the present invention.
Figure 3:
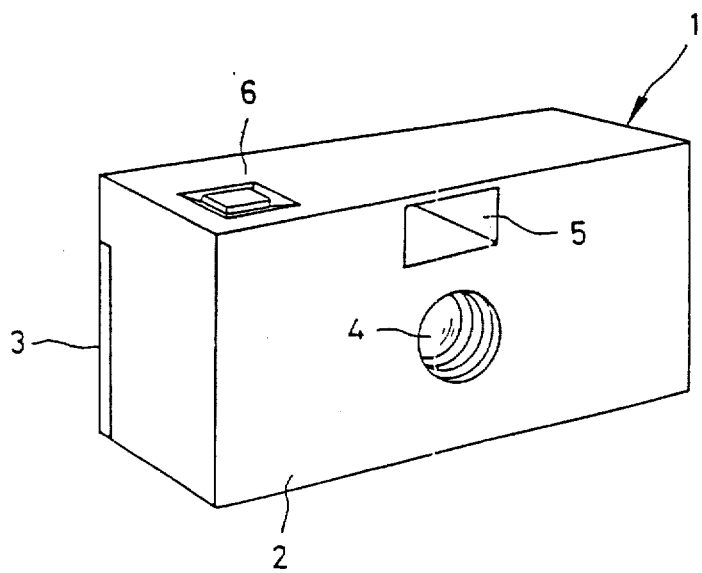
FIG. 3 is a perspective view showing the outward appearance of the photographic light-sensitive material-packed unit of the present invention.

As shown in FIGS. 1-3, a package unit 1 of the invention comprises two principal external parts, a main body base 2 into an opening 2a of which is fitted and sealed a backplate 3. The main body base 2 includes a photographic lens 4, a viewfinder window 5 and a release button 6 for triggering the exposure. A film winding knob 8 is used to wind the film between exposures at an exposure frame 10.

Unexposed film 21 is preloaded as a rolled film in a film roll (first holding) chamber 11 having an opening 11a and is wound after exposure into a patrone placed in a patrone (second holding) chamber 12 having an opening 12a. The patrone shaft 28 of the patrone 20 is engaged with a film winding fork 14. The film engages the teeth of a sprocket 16 and is supported at the exposure frame 10 between a film support surface 15 of the main body base 2 and a similarly curved film regulating surface 30 of the backplate 3. The rolled film 23 is initially threaded through a slit 22a of a winding shaft 22 and supported at an extended film section 26 in the vicinity of the exposure frame 10 by a support plate 27 while the patrone is then supported by a gripping arm 25. After loading of the film, the backplate 3 is sealed to the main body base 2 with its step 32 matching the opening 11a of the film roll chamber 11. The patrone 20 of the assembled package unit 1 faces a breakout panel 37 with a tab 38.

Figure 4:
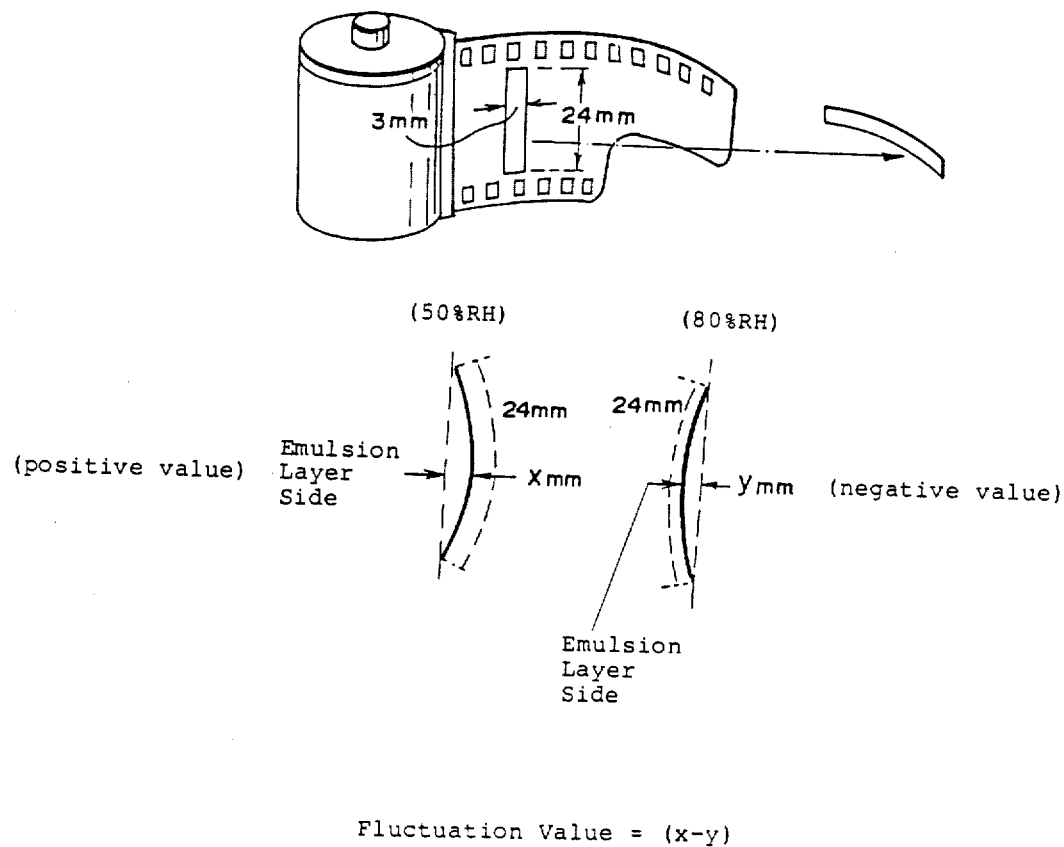
FIG. 4 shows the method of the measurement of the absolute value (x) of the curling of the photographic light-sensitive material for use in the present invention, the curling value being a positive (+) value when the emulsion layer side is convex, while being a negative (−) value when the emulsion layer side is concave. This figure also shows the method of the measurement of the fluctuation value (x-y). In this figure, the size of 24 mm corresponds to the picture plane size of a 135 format film.

The fluctuation value of the curling of the photographic light-sensitive material due to moisture for use in the present invention is measured as mentioned below. The sample to be tested is cut in the tranverse direction of the film strip into the length of the picture plane size of 24 mm. The transverse direction is the direction not receiving the influence of the rolled memory shape of the film (so-called rolled behaviour). The sample is also cut to a width in the longitudinal direction of 3 mm. The difference between the degree of the curling y of the sample as measured under the ambient condition of 25° C. and 80% RH and the curling X of the sample as measured under the ambient condition of 25° C. and 50% RH was obtained in accordance with the directions as shown in FIG. 4. The values thus obtained are represented in terms of units of mm.

The absolute value of the curling is represented by the height x of the center part of the curled sample in millimeters when the sample is left at the equilibrated temperature in the moisture-proof bag-packaged pack unit or hermetically constructed moisture-proof pack unit. The curling value is represented by a positive (+) value when the sample curls into the inside direction of the emulsion layer side of the film and is represented by a negative (−) value when the sample curled in the opposite direction, as shown in FIG. 4.

In the practice of the present invention, the packed unit is packaged in the moisture-proof bag having a humidity of from 65 to 30%, preferably 60% or less, more preferably 55% or less.

In the packed unit of the present invention, the absolute value x of the curling must be from $-1$ to 1.5 mm at the humidity in the inside of the unit. In addition, in the case where the packed unit is not hermetically sealed, the fluctuation value x-y of the curling (because of the variation of humidity) is preferred to be 1.5 mm or less, in addition to the requirement of the above-mentioned absolute value of the curling.

The method for adjusting the fluctuation value and the absolute value of the curling is as mentioned below.

The dependence of the curling upon the humidity can be varied by the adjustment of the amount of the gelatin to be coated, the proportion to gelatin of the materials to be dispersed, such as oils, couplers, etc., the degree of the curling previously imparted to the support (which is little influenced by humidity) and the content of hydroscopic substances, such as KNO$_3$, etc.

Flexible supports which are useful for the present invention include semi-synthetic or synthetic high polymer films such as cellulose nitrate, cellulose acetate, cellulose acetate-butyrate, polystyrene, polyvinyl chloride, polyethylene terephthalate, polycarbonate, etc. Cellulose acetate is especially effective among them, since the adjustment of the curling characteristic is easy.

The photographic film for use in the packed unit of the present invention is preferred to have a higher sensitivity. However, if the sensitivity is too high, the grains would become roughened and so the picture plane size would have to be further enlarged. Accordingly, the film may have an ISO sensitivity of from 250 to 10,000, preferably from 320 to 3,200, from the viewpoint of the portability, the limit to the obscuration of the surroundings around the lens, etc. The film may be either a color negative film or a color reversal film. The support for use in the unit may be either TAC or PET or may also be other organic high polymers. For the impartating of a certain curling to the support, the method described in Japanese Patent Publication 26582/79 is known. A scarcely moisture-permeable film is known to be scratched to cause significant fogging in the emulsion. For the countermeasure thereto, the use of two-layer or multi-layer structured grains containing much iodine in their inside part is preferred, as described in Japanese Patent Application (OPI) No. 143331/85. In addition, the use of high aspect ratio grains having an aspect ratio of from 3 to 15, preferably from 3 to 8, which are described in Japanese Patent Application (OPI) No. 113934/83 is also preferred because of the same reason as above. These grains are preferably mono-dispersed, from the viewpoints of the graininess and the sharpness.

If the absolute value of the curling exceeds 1.5 mm, it becomes necessary to narrow the clearance between the back plate and the film support surface contacting the emulsion layer side of the film (see FIG. 1) to depress the film plane in the direction of the lens, in order to adjust the focus point to 3 m, whereby the back side of the film would strongly be pressed to the back plate 3 during the rolling-up of the film and the film would thus be undesirably scratched.

On the contrary, if the absolute value of the curling is less than $-1.0$ mm, the clearance is required to be made wide. In such case, the focus point fluctuates because of the influence of the fluctuation of the curling of the film between exposed frames and of the curling behaviour of the film, which is a fatal defect. Various methods for varying the absolute value of the curling and its dependence on humidity are known. For example, a first method coats a gelatin layer on the surface of the film opposite to the emulsion layer so as to attain the curling balance between the gelatin layer and the emulsion layer. A second method coats a layer other than gelatin so as to attain the curling balance correspondingly to the swelling or contraction of the emulsion layer during development step. A third method coats a layer which is effective for attaining the curling balance correspondingly to the swelling or contraction of the emulsion layer during development step which however is removed during the said step. Other methods exist.

In order to keep the curling of the photographic film to a proper value, there is a method of previously curling the support to the side opposite to the emulsion layer. For example, there are known a method of coating a swelling agent (such as acetone or the like to cellulose triacetate) on the surface opposite to the emulsion layer and then drying this surface so that the film may curl to the side opposite to the emulsion layer. Another method retards the drying speed of the backing layer during the drying step of the sub layer and the backing layer as coated prior to the coating of the emulsion layer so that the film may curl to th side opposite to the emulsion layer. Again, other methods exist.

The method to be used for the practice of the present invention is characterized by the blowing of a wet hot air having a dew point of 40° C. or higher to the surface of a cellulose triacetate film wherein the curling of the film can be controlled to attain the desired curling by adequately selecting the temperature and the humidity of the wet hot air to be blown and the time of the blowing. The details are described in Japanese Patent Publication No. 26582/79. According to this method, not only the absolute value of the curling but also the curling's dependence on humidity can of course be controlled, and therefore this method can be said to be excellent in the point of controllability.

The photographic material-packed unit of the present invention (so-called lens-combined film unit) is a photographic light-sensitive material-packed unit having an exposure function, which can be easily bought by anyone in the same manner as photographic film is bought. After being used for picture-taking, the unit can directly be brought in for DP processing. FIG. 1 to FIG. 3 show the embodiment of the packed unit of the present invention.

The lens-combined film unit does not have an opening and closing back lid for setting film into the unit or taking out the same therefrom. It also lacks a mechanism for winding-back the film and a complicated exposure controlling mechanism and therefore it can be provided at an extremely low cost. Accordingly, the film unit of this type has great merit in that the picture-taking can be enjoyed by anyone with ease. If a film with a large picture plane size, for example, the most popular patrone-packed 135-film is set in the lens-combined film unit so as to obtain photographs of high image quality, there would be a great problem caused by the difference of the cartridge structure. For example, for the construction of the lens-combined film unit, a method would be considered suitable which includes setting a patrone in the unit body having previously incorporated therein a photographic lens or a shutter, connecting the top of the film to the winding-up shaft and then applying a backboard to the said unit body. In the film unit thus constructed, however, all the film will be drawn out from the patrone when the film has wholly been used for picture-taking. Therefore, the operation of winding-back the exposed film again into the patrone is required prior to the development. Since the film unit of the present invention is a commercial product which is required to be highly convenient, the necessity for the user to wind back the exposed film would detract from the convenience of the lens-combined film unit. As a result, the film unit would not be differentiated from a conventional camera. On the other hand, if the exposed film unit as such is brought into a photofinishing laboratory without taking out the film from the unit body, the film is required to be wound back by anyone in the photofinishing laboratory. For the winding-back operation, some special winding-back device would become necessary. Such a winding-back operation and the device therefor are extremely disadvantageous from the viewpoint of the cost and the time involved.

Under the situation, another technique would be considered suitable for the lens-combined film unit, where an exposed film is set in the unit body without a surrounding casing or patrone so that the exposed film may be reeled into the patrone after every picture-taking operation. According to this technique, all the exposed film would cased into the patrone after the completion of the picture-taking, and therefore the above-mentioned disadvantage can be overcome and the film unit with such technical system can extremely effectively be utilized.

However, the film unit with the above described system has one defect in that its construction by the maker is complicated. Specifically, since the film to be packed into the unit body is a raw film which is not cased into the patrone, the operation for the introduction of the film into the unit body is required to be carried out in a darkroom. In addition, a backboard is required to be firmly fixed to the unit body after the inserting operation.

In order to promote the efficiency of the said operation, a design of providing on the above-mentioned backboard a patrone-holding part for holding an empty patrone and a roll-holding part for holding the film roll not cased in a patrone is being investigated. In the case of using the thus designed system, however, if the film is set into unit along the axial direction of the patrone, the sprocket projecting into the transport path of the film may be caught by the edge of the film whereby the connection with the film perforation would become difficult. On the other hand, if the film is set into the unit from the direction vertical to the film plane, the connection between the film wind-up fork projecting in the axial direction of the patrone and the patrone shaft would become difficult. Accordingly, the operation for covering the back plate over the unit body become complicated. In addition, the attachment to the back plate of the patrone-holding part and the roll-holding part is disadvantageous from the view point of the manufacturing cost. This is one defect in the design. Moreover, since the operation for fixing the back plate is complicated, the manufacturing of the film unit is not suitable for an automatic process. This is another defect.

The lens-combined film unit of the present invention is free from the above-mentioned drawbacks. This unit has a patrone-cased roll of film, as incorporated therein, and this can be constructed simply and efficiently.

Preferably, the lens-combined film unit of the present invention has a container-casing chamber for casing a film container such as a patrone, etc., and a film roll-holding chamber for holding a film roll (which is a raw film roll not cased in a film container). The film roll-holding chamber presses the film roll so that this may not be unrolled and loosened, without the use of a winding shaft, as incorporated in the unit body having a photographic lens and a shutter.

When a film container and a raw film roll which has been drawn out from the container are set in the unit body having the above-mentioned structure, the extended part 26 of the film which is stretched between the film container 20 and the film roll 23 is curved toward the direction of the back plate side so that the film plane may be free from the sprocket 16 and therefore the film may not be caught by the sprocket. Thereby, the setting of the film in the unit body can be smoothly carried out. In addition, the stretched film part thus curved may be pressed in a determined position by the back plate as covered over the back side of the unit body, and thus the connection between the sprocket and the perforation can be ensured.

The embodiment of the film unit as mentioned above is specifically illustrated in Japanese Patent Application No. 246987/86, etc. For reference, FIG. 1 to FIG. 3 are attached hereto, each showing the preferred embodiment of the film unit structure of the present invention. In the film-packed unit of the present invention, the raw film roll is directly held in the film roll-holding chamber and is drawn out from the chamber by the action of the sprocket and set on the film-supporting plane of the unit body, as opposed to the conventional unit system using a film roll cartridge. Therefore, the photographic light-sensitive material (film) to be used in the unit is required to have a suitable curling characteristic and high dimension stability. The object of the present invention can be attained only when these characteristic and property can surely be satisfied.

The drawings will be explained hereunder. FIG. 3 is a view to show the outward aspect of one embodiment of the photographic light-sensitive material-packed unit 1 of the present invention, which is composed of a front body part 2, a backboard 3, a photographic lens 4, a view finder window 5 and a release button 6. Preferably, the lens 4 has a focal length of between 30 and 40 mm. The back plate 3 is fixed to the front body 2 by ultrasonic fusion or the like. FIG. 1 is an oblique view to show one embodiment of the lens-combined photographic lightsensitive material-packed unit 1 of the present invention. The unit 1 is disassembled into sections of the front body 1, the stretched part 26 of the light-sensitive material (film) and the backboard 3. FIG. 2 is a sectional view of the essential parts of the unit 1. In the packed unit 1 of FIGS. 1 to 3, a light-sensitive material film, which is, for example, cut into a 135 format size, is rolled to form a film roll 23 having a diameter of 8 mm to 30 mm and is put in the film roll chamber 11 in such manner that the film roll 23 may not be unrolled. One end of the film is fixed to the winding shaft 28 of the patrone 20 and the perforations of the film are mated to the teeth of the sprocket 16 so that the light-sensitive plane of the film may firmly be contacted with the film-supporting plane. The backplate 3 is then applied to the body from the upper side so that the inside of the unit 1 may be positively shielded from light. Thereafter, the backboard and the body are preferably fused, for example, by ultrasonic fusion. For the application of the backboard to the body, the method of fixing the backboard 3 with screws is not proper, as being poor in the moisture-proofness; and the method of using an adhesive is also not proper, as being poor in the productivity.

Accordingly, in the embodiment of the packed unit of the present invention, the photographic light-sensitive material (film) is directly set in the film roll chamber 11 and is drawn up therefrom by the rotation of the reeling-up nob 8 whereupon the film slides on the film-supporting plane 15 synchronously with the rotation of the folk 14 and the feeding of the sprocket 16, so that the film may adquately be fed without being unrolled at random. The back surface of the film only slides on the film-controlling plane 30, and the backboard 3 does not have a pressure plate or the like. The photographic lens to be used in the packed unit of the present invention has an F-value large than 4, preferably falling within the range of from 8 to 16, and this is preferably a glass or plastic single lens having a focal length (f-value) of from 30 to 40 mm. In order to reduce the aberration of the edge of the image field, the film-supporting plane is preferably formed to have a curved plane.

It will be understood that in the packed unit having the above-mentioned structure the photographic light-sensitive material film to be used in the said unit is required to have a special curling characteristic in order to attain the object of the present invention for obtaining image of high quality.

The moisture-proof bag used in the present invention is a bag which is prepared by a substantially moisture-impermeable material. As a moisture-proof material, it is selected, for example, from aluminum foil, polyethylene resin, polypropyrene resin, regid polyvinyl chloride resin, polyvinylidene chloride resin, polycarbonate resin, polystyrene resin, polyester resin, or polyamide resin alone or in combination. The combination of aluminum foil and polyethylene resin, polypropyrene resin, polyester resin or polyvinylidene chloride resin are preferred. The resin films are also used by vapor deposition of aluminum. It is more preferred that one side of the moisture-proof bag is anchor-coated for printing and a copolymer film layer of ethylene and vinyl acetate which can be subjected to thermal fusion is provided on the opposite layer, if desired, as disclosed in Japanese Utility Model Application (OPI) No. 186140/87.

Thermal fusion or ultrasonic fusion is preferably carried out by applying a ultrasonic horn leading from a ultrasonic generator to a portion which is to be fused. Details are disclosed in Japanese Utility Model Application No. 5696/87.

In the photographic emulsion layers of the silver halide photographic materials of the present invention, any of silver bromide, silver iodobromide, silver iodochlorobromide, silver chlorobromide or silver chloride can be used. A preferred silver halide is silver iodobromide containing 30 mol % or less silver iodide as a mean halogen composition. Especially preferred is silver iodobromide containing silver iodide in an amount of from 2 mol % to 20 mol %. In order to provide both high sensitivity and high image quality, it is preferred to adjust the mean silver iodide content of the silver halide in all the emulsion layers to 8 mol % or more. It is known that elevation of the mean silver iodide content in silver halide is effective for a remarkable improvement in graininess and for improvement of fog stability and microimage sharpness. However, if the silver iodide content become higher than a certain limit, some defects will be cased, including a retardation of development speed and of desilvering and fixing speed.

In accordance with the present invention, these defects are negligible, even though the silver iodide content in the silver halide emulsion is elevated. Accordingly, the overall applicability of the silver halide grains is great elevated and the silver halide content can be lowered.

It is preferred that the silver halide grains used in the photographic emulsion layer of the silver halide photographic material of the present invention have a two-layer or multi-layer structure comprising a core, which consists substantially of silver iodobromide having a silver iodide content of 5 mol % or more, and a shell, which covers the core and which consists substantially of silver iodobromide having a silver iodide content lower than that in the core, or silver bromide or silver chloride or a mixture thereof. The silver iodide content in the core is more preferably 10 mol % or more, most preferably from 20 mol % to 44 mol % inclusive. The silver iodide content in the shell is preferably 5 mol % or less.

The core can contain silver iodide uniformly, or can have a multi-layer structure comprising plural phases of different silver iodide contents. In the latter case, the silver iodide content in the phase having the highest silver iodide content in the core is best 5 mol % or more, more preferably 10 mol % or more, and the silver iodide content in the shell is best lower than that in the highest silver iodide content phase of the core. The phrase "silver halide consisting substantially of silver iodobromide" means that the silver halide consists essentially of silver iodobromide but may contain any other component up to about 1 mol % or so.

As a more preferred embodiment of the silver halide grains used in the photographic emulsion of the silver halide photographic material for use in the present invention, silver halide grains having a structure which meets the following criterion can be used: in determining the curve of diffraction strength to diffraction angle of the (220) plane of the grains by the use of $K\beta$ ray of Cu within the range of the diffraction angle ($2\theta$) of from 38 to 42°, two diffraction maximum peaks of the diffraction peak corresponding to the core part and the diffraction peak corresponding to the shell part and one minimum peak between the two maximum peaks, the diffraction strength corresponding to the core part to that corresponding to the shell part being from 1/10 to 3/1. Most preferably, the diffraction strength ratio is from 1/5 to 3/1, more preferably from 1/3 to 3/1.

Because of the two-layer or multi-layer structure, it is possible to use high iodine silver iodobromide emulsions without retarding the development speed, and, therefore, the preparation of photographic light-sensitive materials having excellent graininess is possible even with the use of a small amount of coated silver.

The silver halide emulsion layer for use in the present invention preferably contains chemically sensitized silver halide grains in which the total content of the metal impurities other than gold and iridium is 3 ppm or less, and by the use of such silver halide grain-containing emulsions, silver halide photographic materials of high sensitivity can be obtained.

In the preparation of the earlier discussed silver halide emulsions in which the content of the metal impurities (other than gold and iridium) contained in the silver halide grains is extremely small, various techniques can be employed in optional combinations, not only for purification of the raw materials for the preparation of the silver halide emulsion, for example, hydrophilic colloids such as water and gelatin, soluble silver salts such as silver nitrate as well as soluble alkali halides such as KBr, KCl, KI, NaBr and NaCl, to remove the metal impurities contained in the raw materials, but also for prevention of the incorporation of any metal impurities from the reaction container into the reaction materials during the preparation of the silver halide emulsion, and also for adjustment of the reaction temperature and the reaction conditions, etc.

The mean grain size (the diameter of the grain when the grain is spherical or approximates spherical, or the mean value based on the projected area using the edge length as the grain size when the grain is a cubic grain) is, although not limitative, preferably from 0.05 $\mu$m to 10 $\mu$m (inclusive). When the color-sensitive layer unit comprises two or more plural emulsion layers, the mean grain size of the silver halide grains in the highest sensitive emulsion among all the layer unit is preferably from 0.5 $\mu$m to 4 $\mu$m (inclusive), more preferably from 0.8 $\mu$m to 2.5 $\mu$m (inclusive).

The grain size distribution may be narrow or broad.

The silver halide grains in the photographic emulsion may have a regular crystal form such as cubic or octahedral, etc., or an irregular crystal form such as spherical or tabular, or further can have a composite form of such crystal forms. Also, the emulsion may contain various grains of different crystal forms.

Tabular silver halide grains as can be used in the present invention are preferably those having an aspect ratio (diameter/thickness) of 5 or more, for example 8 or more. Especially those having an aspect ratio of from 5 to 8 are preferred.

The diameter of a silver halide grain means the diameter of a circle having the same area as the projected area of the grain. The diameter of a tabular silver halide grain for use in the present invention is from 0.3 to 5.0µ, preferably from 0.5 to 3.0µ.

The thickness of the grains is 0.4µ or less, preferably 0.3µ or less, more preferably 0.2µ or less.

In general, tabular silver halide grains are those having two parallel planes, and accordingly the above "thickness" is represented by the distance between the two parallel planes constituting the tabular silver halide grain.

Tabular silver halide grains can also be used in the form of a monodispersion as the dispersed state of the grain diameter and/or the grain thickness of the silver halide grains, as described in Japanese Patent Publication No. 11386/72.

The proportion of the tabular silver halide grains contained in the emulsion for use in the present invention is preferably 50% or more, more preferably 70% or more, especially preferably 90% or more, of the total projected area of all the silver halide grains contained in the emulsion.

In the case of multi-layered tabular silver iodobromide grains for use in the emulsion of the present invention, such grains may be composed of a layered structure comprising plural different phases each having a different iodide content. In this regard, Japanese Patent Application (OPI) Nos. 113928/83 and 99433/84 disclose preferred examples of the halogen composition and the intragranular halogen distribution of tabular silver halide grains. In general, it is preferred that the desired relation of the relative iodide content in each layer of a multi-layered tabular silver halide grains be most preferably selected in accordance with the condition of the development process to be applied to the tabular silver halide grain-containing photographic light-sensitive material (for example, the amount of the silver halide solvent in the developer), etc.

Tabular silver halide grains may also be junction structure type silver halide grains composed of an oxide crystal part such as PbO and a silver halide crystal part such as silver chloride, or epitaxial growth type silver halide grains, for example, composed of a silver bromide host crystal having a silver chloride, silver iodobromide or silver iodide crystal part epitaxially grown over a host crystal, or composed of a hexagonal or octahedral silver iodide host crystal having silver chloride, silver bromide, silver iodide or silver chloroiodobromide epitaxially grown over a host crystal. Examples of these grains are given in U.S. Pat. Nos. 4,435,501, 4,463,087, etc.

Tabular grains can easily be prepared in accordance with the methods described in Gutoff, *Photographic Science and Engineering*, Vol. 14, pages 248-257 (1970); U.S. Pat. Nos. 4,434,226, 4,414,310, 4,433,048 and 4,439,520, British Pat. No. 2,112,157, etc.

Monodispersed silver halide emulsion means that the mean grain size ($\bar{r}$) is larger than about 0.1µ and the ratio of the standard deviation to the grain size (S/$\bar{r}$) is 0.20 or less. In general, silver halide emulsions for use in the present invention can be prepared in a conventional manner, for example, by the methods described in *Research Disclosure*, Vol. 176, No. 17643 (December, 1978), pages 22 to 23, "I. Emulsion Preparation and Types", and ibid., Vol. 187, No. 18716 (November, 1979), page 648.

The photographic emulsions for use in the present invention can be prepared using the methods described, for example, in P. Glafkides, *Chemie et Physique Photographique* (published by Paul Montel, 1967); G. F. Duffin, *Photographic Emulsion Chemistry* (published by Focal Press, 1966); V. L. Zelikman et al., *Making and Coating Photographic Emulsions* (published by Focal Press, 1964), etc.

For example, the silver halide emulsions may be prepared by an acid method, a neutralization method, an ammonia method, etc. Also, a method of reacting a soluble silver salt and a soluble halide(s), a single jet method, a double jet method, or a combination thereof may be used.

A reverse mixing method capable of forming silver halide grains in the presence of excess silver ions can be employed.

As one double jet method, a controlled double jet method maintaining a constant pAg in the liquid phase for forming the silver halide grains can also be employed.

According to the method, a silver halide emulsion containing silver halide grains having a regular crystal form and almost uniform grain sizes can be obtained.

Two or more silver halide emulsions prepared separately can be blended for use in the photographic light-sensitive materials of the present invention.

For the silver halide emulsions for use in the present invention, silver halide grains having a crystal face as defined by the Mirror index (n n 1) (n≧2, n is a natural number) on the outer surface, which are described in Disclosure Bulletin 86-9598, are preferably used.

Silver halide grains having hollow conduits from the surface to the internal part, which are described in Japanese Patent Application (OPI) No. 75337/86, can also be preferably used. Such silver halide grains having a high specific surface area, when color-sensitized, show high sensitivity, as compared with grains having the same volume, and therefore, these can effectively be used in the practice of the present invention.

Composite silver halide grains formed by epitaxial growth of a different silver halides on a host grain, which are described in Japanese Patent Application (OPI) Nos. 133540/82, 108526/83 and 162540/84, are also preferably used in the present invention. These grains are especially preferred in the present invention, as they have high sensitivity and high contrast.

The silver halide emulsion described in Japanese Patent Application (OPI) Nos. 14630/86 and 122935/85, where the silver halide grains are grown in the presence of a tetrazaindene, can preferably be used in the present invention, since the silver iodide content is high and the monodispersibility is excellent and thus the emulsion is highly sensitive and has excellent graininess.

The silver halide emulsions described in Japanese Patent Application (OPI) No. 126526/83 where gold-sulfur sensitization or gold-selenium sensitization is carried out in the presence of a nitrogen-containing heterocyclic compound, are also preferably used in the present invention, since fog is low and sensitivity is high, thus, the emulsion has high quality.

The silver halide crystals described in Japanese Patent Application (OPI) Nos. 149345/84 and 149344/84, which are slightly roundish cubic or tetradecahedral, can also preferably be used in the silver halide emulsion of the present invention, since they form an emulsion of high sensitivity.

The silver halide grains may also be formed (or physically ripened) in the presence of a cadmium salt, a zinc salt, a lead salt, a thallium salt, an iridium salt or a complex salt thereof, a rhodium salt or a complex salt thereof, an iron salt or a complex salt thereof, etc.

Among these, a silver halide emulsion containing grains formed in the presence of iridium is especially preferred as an emulsion for use in the present invention, since such has high sensitivity (see Japanese Patent Publication Nos. 4953/68 and 32738/70).

In the process for the preparation of silver halide emulsions, in general, soluble salts are removed after the formation of silver halide precipitates or after physical ripening thereof. For this, a conventional noodle washing method in which gelatin is gelled for the removal of the soluble salts, or a flocculation method in which a polyvalent anion-containing inorganic salt such as sodium sulfate, or an anionic surfactant or an anionic polymer such as polystyrene sulfonic acid, or a gelatin derivative such as an aliphatic acylated gelatin, an aromatic acylated gelatin or an aromatic carbamoylated gelatin, etc., is used for the said removal, can be employed.

The silver halide emulsion for use in the present invention is, in general, chemically sensitized. For chemical sensitization, for example, the method described in H. Frieser, *Die Grundlagen der Photographischen Prozesse mit Silver-halogeniden*, (published by Acakemische Verlangsgessellchaft, 1968), pages 675 to 734, can be employed.

For instance, a sulfur sensitization method using active gelatin or a sulfur-containing compound capable of reacting with silver (e.g., thiosulfates, thioureas, mercapto compounds, rhodanines, etc.), a reduction sensitization method using a reducing material (e.g., stannous salts, amines, hydrazine derivatives, formamidinesulfinic acid, silane compounds, etc.), a noble metal sensitization method using a noble metal compound (e.g., gold complex salts and complex salts of metals belonging to group VIII of the Periodic Table, such as platinum, iridium, palladium, etc.) can be used, individually or as a combination thereof.

The photographic emulsion for use in the present invention may be spectrally sensitized by methine dyes, etc., if desired. The dyes which may be used for such purpose include cyanine dyes, merocyanine dyes, complex cyanine dyes, complex merocyanine dyes, holopolar dyes, hemicyanine dyes, styryl dyes and hemioxonole dyes. Particularly useful dyes are cyanine dyes, merocyanine dyes and complex merocyanine dyes. These dyes can involve various nuclei which are usually used in conventional photographic cyanine dyes as basic heterocyclic nuclei, e.g., such nuclei include pyrroline nuclei, oxazoline nuclei, thiazoline nuclei, pyrrole nuclei, oxazole nuclei, thiazole nuclei, selenazole nuclei, imidazole nuclei, tetrazole nuclei, pyridine nuclei, etc.; the nuclei obtained by fusing aliphatic hydrocarbon rings to these nuclei and the nuclei obtained by fusing aromatic hydrocarbon rings to these nuclei, such as indolenine nuclei, benziindolenine nuclei, indole nuclei, benzoxazole nuclei, naphthoxazole nuclei, benzothiazole nuclei, naphthothiazole nuclei, benzoselenazole nuclei, benzimidazole nuclei, quinoline nuclei, etc. Each of these nuclei may have a substituent on one or more carbon atoms of the dye.

The merocyanine dyes or complex merocyanine dyes can be 5-membered or 6-membered heterocyclic nuclei such as pyrazoline-5-one nuclei, thiohydantion nuclei, 2-thiooxazolidine-2,4-dione nuclei, thiazolidine-2,4-dione nuclei, rhodanine nuclei, thiobarbituric acid nuclei, etc., such nuclei having a ketomethylene structure.

As useful sensitizing dyes, there may be mentioned, for example, those described in West German Pat. Nos. 929,080, U.S. Pat. Nos. 2,231,658, 2,493,748, 2,503,776, 2,519,001, 2,912,329, 3,656,959, 3,672,897, 3,694,217, 4,025,239 and 4,046,572, British Pat. No. 1,242,588 and Japanese Patent Publication Nos. 14030/69 and 24844/77.

Such sensitizing dyes can be used singly or as a combination thereof. A combination of sensitizing dyes is frequently used for the purpose of supersensitization. Specific examples of supersensitizing dyes are given in U.S. Pat. Nos. 2,688,545, 2977,229, 3,397,060, 3,522,052, 3,527,641, 3,617,293, 3,628,964, 3,666,480, 3,672,898, 3,679,428, 3,703,377, 3,769,301, 3,814,609, 3,837,862 and 4,026,707, British Pat. Nos. 1,344,281 and 1,507,803, Japanese Patent Publication Nos. 4936/68 and 12375/78 and Japanese Patent Application Nos. (OPI) 110618/77 and 109925/77.

The silver halide emulsions for use in the present invention may further contain, together with the sensitizing dye(s), dyes which have no spectral sensitizing action by themselves or materials which do not substantially absorb visible light but show a supersensitizing action. For example, the emulsions may contain nitrogen-containing heterocyclic group-substituted aminostyryl compounds (e.g., those described in U.S. Pat. Nos. 2,933,390 and 3,635,721), aromatic organic acid/formaldehyde condensation products (e.g., those described in U.S. Pat. No. 3,743,510), cadmium salts, azaindene compounds, etc. In particular, the combinations described in U.S. Pat. Nos. 3,615,613, 3,615,641, 3,617,295 and 3,635,721 are especially useful.

In the practice of the present invention, the silver halide emulsions subjected to supersensitiation with a compound having the following formula (I) described in Japanese Patent Application No. 122759/85 are especially preferred.

in which $R^0$ represents an aliphatic, aromatic or heterocyclic group substituted by at least one —COOM, —SO$_3$M or hydroxyl group; and M represents a hydrogen atom, an alkali metal atom, a quaternary ammonium group or a quaternary phosphonium group.

Specific examples of compounds of formula (I) are described, for example, in Japanese Patent Application No. 201756/86, pages 38 to 41.

The photographic light sensitive material for use in the present invention can further contain a color coupler or a compound capable of coloring by an oxidative coupling reaction with an aromatic primary amine developing agent (for example, phenylenediamine derivatives, aminophenol derivatives, etc.) during color development, together with the above-mentioned compound of formula (I), or separately therefrom, in the same or other different photographic emulsion layers, or non-photosensitive emulsion layers.

In general, a multi-layer silver halide color photographic material for use in the present invention contains yellow, magenta and cyan color-forming couplers.

Usable color couplers are cyan, magenta and yellow color-forming couplers, and typical examples of these couplers include naphthol or phenol series compounds, pyrazolone or pyrazoloazole series compounds and openchain or heterocyclic ketomethylene compounds. Specific examples of the cyan, magenta and yellow couplers which can be used in the present invention are described in the patent specifications as referred to in *Research Disclosure* 17643 (December, 1978), VII-D, and ibid., 18717 (November, 1979).

It is preferred that the color couplers incorporated into the photographic light-sensitive materials of the present invention are non-diffusible due to having a ballast group or being polymerized. Also, the use of 2-equivalent color couplers substituted by a releasable group can reduce the amount of silver for the color photographic materials as compared to 4-equivalent color couplers having a hydrogen atom at the coupling active site. Couplers giving colored dyes having proper diffusibility, non-color-forming couplers, DIR couplers releasing a development inhibitor on the coupling reaction, or DAR couplers releasing a development accelerator on the coupling reaction can also be used in the present invention.

As yellow couplers for use in the present invention there are oil protected acylacetamido couplers as typical examples. Specific examples of these couplers are given in U.S. Pat. Nos. 2,407,210 2,875,057, 3,265,506, etc. In the present invention, 2-equivalent yellow couplers may be used, and specific examples of these yellow couplers are the oxygen atom-releasing type yellow couplers given in U.S. Pat. Nos. 3,408,194, 3,447,928, 3,933,501, 4,022,620, etc., and the nitrogen atom releasing type yellow couplers given in Japanese Patent Publication No. 10739/83, U.S. Pat. Nos. 4,401,752 and 4,326,024, *Research Disclosure,* 18053 (April, 1979), British Pat. No. 1,425,020, West German Patent Application (OLS) Nos. 2,219,917, 2,261,361, 2,329,587 and 2,433,812, etc. Of these yellow couplers, α-pivaloylacetanilide couplers are excellent in fastness, in particular light fastness of the colored dyes formed, while α-benzoylacetanilide couplers are excellent in coloring density.

As magenta couplers for use in the present invention, there are oil protected type indazolone series or cyanoacetyl series magenta couplers, preferably 5-pyrazolone series magenta couplers, and other pyrazoloazole series couplers such as pyrazolotriazoles. As 5-pyrazolone series magenta couplers, those substituted by an arylamino group or an acylamino group at the 3-position thereof are preferred from the viewpoint of the hue and coloring density of the colored dyes formed. Specific examples of these couplers are given in U.S. Pat. Nos. 2,311,082, 2,343,703, 2,600,788, 2,908,573, 3,062,653, 3,152,896 and 3,936,015, etc. As releasable groups for the 2-equivalent 5-pyraozlone series couplers, the nitrogen atom-releasing groups described in U.S. Pat. No. 4,310,619 and the arylthio groups described in U.S. Pat. No. 4,351,879 are especially preferred. Furthermore, the 5-pyrazolone series couplers having a ballast group described in European Pat. No. 73,636 give high coloring density.

As pyrazoloazole series coupers, useful are the pyrazolobenzimidazoles described in U.S. Pat. No. 3,369,879, preferably the pyrazolo[5,1-c][1,2,4]triazoles described in U.S. Pat. No. 3,725,067, the pyrazoloterazoles described in *Research Disclosure* 24220 (June, 1984) and the pyrazolopyrazoles described in *Research Disclosure* 24220 (June, 1984). The imidazo[1,2-b]pyrazoles described in European Pat. No. 119,741 are preferred because of the small yellow side-absorption of the colored dyes obtained and the high light fastness thereof, and the pyrazolo[1,5-b][1,2,4]triazoles described in European Pat. No. 119,860 are specifically preferred.

As cyan couplers for use in the present invention, there are the oil protected type naphthol series or phenol series couplers, and specific examples of these couplers are the naphthol series couplers given in U.S. Pat. No. 2,474,293, and preferably the oxygen atom-releasing 2-equivalent naphthol series couplers described in U.S. Pat. Nos. 4,052,212, 4,146,396, 4,228,233 and 4,296,200. Specific examples of phenol series couplers are described in U.S. Pat. Nos. 2,369,929, 2,801,171, 2,772,162, 2,895,826, etc. Cyan coupler having high fastness to humidity and temperature are preferably used in the present invention, and typical examples of these cyan couplers include the phenol series cyan couplers having an alkyl group or 2 or more carbon atoms at the meta-position of the phenol nucleus as described in U.S. Pat. No. 3,772,002; the 2,5-diacylamino-substituted phenol series couplers as described in U.S. Pat. Nos. 2,772,162, 3,758,308, 4,126,396, 4,334,011 and 4,327,173, West German Patent Application (OLS) No. 3,329,729, Japanese Patent Application (OPI) No. 166956/84; and the phenol series couplers having a phenylureido group at the 2-position thereof and an acylamino group at the 5-position thereof as described in U.S. Pat. Nos. 3,446,622, 4,333,999, 4,451,559 and 4,427,767, etc.

In order to compensate for the unnecessary absorption in the short wavelength range of the dyes formed from the magenta couplers and cyan couplers, it is preferred to use a colored coupler in the color photographic materials for picture taking. Typical examples of the colored couplers include the yellow colored magenta couplers described in U.S. Pat. No. 4,163,670, Japanese Patent Application No. 39413/82; and the magenta colored cyan couplers described in U.S. Pat. Nos. 4,004,929, 4,138,258, British Pat. No. 1,146,368, etc.

In the present invention, by using couplers giving colored dyes having a proper diffusibility together with the aforesaid color couplers, the graininess of color images formed can be improved. Regarding such dull couplers, examples of magenta couplers are described in U.S. Pat. No. 4,366,237 and British Pat. No. 2,125,570, and examples of yellow, magenta and cyan couplers are described in European Pat. No. 96,570 and West German Pat. No. Application (OLS) No. 3,234,533.

The dye-forming couplers and the above described specific couplers for use in the present invention may form dimers or higher polymers. Typical examples of polymerized dye-forming couplers are given in U.S. Pat. Nos. 3,451,820 and 4,080,211. Specific examples of polymerized magenta couplers are given in British Pat. No. 2,102,173 and U.S. Pat. No. 4,367,282.

These couplers may be either 4-equivalent or 2-equivalent (to silver ion). In addition, these may be either colored couplers having a color compensating effect or DIR couplers capable of releasing a development inhibitor with development.

Furthermore, the photographic materials can also contain, apart from the DIR couplers, colorless DIR coupling compounds which give a colorless product by a coupling reaction and which release a development inhibitor. Also, the materials can further contain other compounds capable of releasing a development inhibitor on development, apart from the DIR couplers.

The various kinds of couplers for use in the present invention may be used in the same photographic layer of a color photographic material as a combination of two or more kinds thereof to meet particular characteristics desired for a color photographic material, or the same kind of coupler may be used for two or more photographic layers to meet desired characteristics.

For the introduction of the couplers of the present invention and other couplers used into the silver halide emulsion layers, known methods, for example, the method as described in U.S. Pat. No. 2,322,027 can be used. For instance, the coupler is dissolved in a solvent, for example, alkyl phthalates (e.g., dibutyl phthalate, dioctyl phthalate, etc.), phosphoric acid esters (e.g., diphenyl phosphate, triphenyl phosphate, tricresyl phosphate, dioctylbutyl phosphate, etc.), citric acid esters (e.g., tributyl acetylcitrate, etc.), benzoic acid esters (e.g., octyl benzoate, etc.), alkylamides (e.g., diethyl-laurylamide, etc.), fatty acid esters (e.g., dibutoxyethyl succinate, diethyl azelate, etc.), trimesic acid esters (e.g., tributyl trimesate, etc.), etc., or dissolved in an organic solvent having a boiling point of from about 30° C. to about 150° C., for example, lower alkyl acetates (e.g., ethyl acetate, butyl acetate, etc.), or ethyl propionate, secondary butyl alcohol, methylisobutylketone, β-ethoxyethyl acetate, methyl cellosolve acetate, etc., and then the resulting solution is dispersed into a hydrophilic colloid. The above-mentioned high boiling point organic solvents and low boiling point organic solvents can be used in mixture.

In addition, the dispersion method with a polymer described in Japanese Patent Publication No. 39853/76 and Japanese Patent Publication (OPI) No. 59943/76 can also be used.

When the coupler has an acid group such as a carboxylic acid or sulfonic acid group, it can be introduced into the hydrophilic colloid in the form of an alkaline aqueous solution.

As the binder or protective colloid which can be used for the emulsion layer(s), interlayer(s), etc., of the photographic materials of the present invention, gelatin is advantageously used, but other hydrophilic colloids can also be used singly or together with gelatin.

The binder for use in the present invention can preferably be selected from the compounds of general formula (II) to follow. In addition, an active halogen compound (e.g., 2,4-dichloro-6-hydroxy-1,3,5-triazine, etc.) can also be used.

(II)

in which $R_1$ and $R_2$ may be same or different and each represents a hydrogen atom, a hydroxyl group or a substituted or unsubstituted alkyl group, such as methyl group, ethyl group, isopropyl group or hydroxyethyl group; Z represents a bond or a divalent group, for example, a nonmetallic atom such as oxygen or sulfur or a substituted or unsubstituted divalent amino group, or an alkylene group containing such an atom such as ethylenedioxy group, etc.; n and m may be same or different and each represents an integer of from 1 to 8.

Specific examples of such compounds are given, for example, in Japanese Patent Publication No. 24259/72, Examples 1 to 6; Japanese Patent Publication No. 13563/74, Production Examples; and Japanese Patent Publication No. 24902/82, Compound Examples.

The photographic light-sensitive material for use in the present invention can contain various known ingredients. For example, a color image stabilizer, a color mixing preventing agent, an ultraviolet absorbent, a stain inhibitor, a color fog inhibitor, a dye, a color development promoter, a crystal plane conversion retarder (CR compound), a brightening agent, a surfactant, a mordant agent, a binder, a hardener, etc., which are described, e.g., in U.S. Pat. Nos. 4,540,654, 4,599,301, 4,607,002, 4,327,173 and 4,430,423 and Japanese Patent Application (OPI) No. 17448/88 and Japanese Patent Application No. 190629/86, can be incorporated into the respective light-sensitive layers, antihalation layer (AH), backing layer (BL), medium layer (ML), funtional layer (FL), yellow filter layer (YF), protective layer (PL), etc.

The layer arrangement of the photographic light-sensitive material for use in the present invention is described, for example, in Japanese Patent Publications Nos. 15495/74, 34932/80, 37017/78 and 37018/78, Japanese Patent Application (OPI) Nos. 177551/84, 160135/84, 177552/84, 180555/84, 180556/84, 182451/84 and 204038/84, U.S. Pat. Nos. 4,184,876, 4,129,446, 4,186,016, 4,186,011, 4,267,264, 4,173,279, 4,157,917 and 4,165,236, British Pat. Nos. 1,560,965, 2,128,962 and 2,137,372, and Japanese Patent Application No. 234518/86, etc.

The photographic light-sensitive material for use in the present invention generally has a protective layer, which preferably has a thickness of from $0.5\mu$ to $5\mu$, and which is especially preferably made of any one of the following compositions (1), (2) and (3).

(1) The hardener as represented by formula (II) is added to the protective layer to harden the layer itself or other layer(s).

(2) Using a water-insoluble and organic solvent-soluble polymer dispersion; an ultraviolet absorbent, a color image-stabilizer, a mordant agent, etc., are added.

(3) Vinyl series polymer latex grains or a fine inorganic powder are added, preferably in the form of a mixture of two or more grains or powders each having a different mean grain size. As the fine inorganic powder, a silica gel, etc., is preferred.

As flexible supports usable for the materials of the present invention, there may be mentioned, for example, a film made of a semi-synthetic or synthetic polymer, such as cellulose nitrate, cellulose acetate, cellulose acetate-butyrate, polystyrene, polyvinyl chloride, polyethylene terephthalate, polycarbonate, etc., a paper on which was coated or laminated a baryta layer or an α-olefin polymer (such as polyethylene, polypropylene, ethylene/butene copolymer), etc. The support may be colored with a dye or pigment. For the purpose of shielding from light, the support may be blackened. The surface of the support is generally coated with a subbing layer so as to improve the adhesiveness with the photographic emulsion layers, etc. In addition, the surface of the support can be processed by glow discharge, corona discharge, ultraviolet irradiation or flame treatment, before or after the provision of the subbing layer.

The color photographic light-sensitive materials of the present invention can be developed in a conventional manner, for example, by the methods as described in the aforesaid *Research Disclosure* 17643, pages 28 to 29, and ibid., 18716, page 651, from left-hand to right-hand column.

The color developer to be used for the development of the photographic light-sensitive material of the present invention is preferably an alkaline aqueous solution consisting essentially of an aromatic primary amine developing agent. As the color developing agent, although aminophenol series compounds are useful, p-phenylenediamine series compounds are preferably used. As specific examples thereof there are mentioned 3-methyl-4-amino-N,N-diethlaniline, 3-methyl-4-amino-N-ethyl-N-β-hydroxyethylaniline, 3-methyl-4-amino-N-ethyl-N-β-methanesulfonamidoethylaniline, 3-methyl-4-amino-N-ethyl-N-β-methoxyethylaniline and sulfates, hydrochlorides and p-toluenesulfonates thereof. These diamines are preferably used in the form of their salts, as the salts are more stable than the free forms.

The color developer generally contains a pH buffer such as alkali metal carbonates, borates or phosphates; a developement inhibitor or anti-foggants such as bromides, iodides, benzimidazoles, benzothiazoles or mercapto compounds, etc. If desired, a preservative such as hydroxylamine, dialkylhydroxylamine derivatives of sulfites; an organic solvent such as triethanolamine or diethylene glycol; a development promoter such as benzyl alcohol, polyethylene glycol, quaternary ammonium salts or amines; a dye-forming coupler; a competing coupler; a nucleating agent such as sodium borohydride; an auxiliary developing agent such as 1-phenyl pyrazolidone; a tackifier; various kinds of chelating agents such as amino-polycarboxylic acids, aminopolyphosphonic acids, alkylphosphonic acids or phosphonocarboxylic acids; an antioxodant such as the compounds described in West German Patent Application (OLS) No. 2,622,950, etc., can further be added to the color developer.

In the case of the development of a reversal color photographic light-sensitive material, in general the material is first subjected to black-and-white development and then to color development. As the black-and-white developer for use in the black-and-white development step, any known black-and-white developing agent, for example, dihydroxybenzenes such as hydroquinone, etc., 3-pyrazolidones such as 1-phenyl-3-pyrazolidone, etc., or aminophenols such as N-methyl-p-aminophenol, etc., can be used singly or in the form of a combination of these compounds.

After color development, the photographic emulsion layer is generally bleached. The bleaching can be carried out simultaneously with fixing or separately therefrom. In order to accelerate processing, the photographic material can be subjected to bleach-fixing, after development. As the bleaching agent there can be used, for example, compounds of poly-valent metals such as iron (III), cobalt (III), chromium (VI), copper (II), etc., as well as peracids, quinones, nitroso compounds, etc. Typical bleaching agents are ferricyanides; bichromates; organic complexes with iron (III) or cobalt (III), for example, complexes of amino-polycarboxylic acids such as ethylenediaminetetraacetic acid, diethylenetriaminepentaacetic acid, nitrilotriacetic acid, 1,3-diamino-2-propanoltetraacetic acid, etc., or of organic acids such as citric acid, tartaric acid, malic acid, etc.; persulfates; manganates; nitrosophenol, etc. In particular, ethylenediaminetetraacetic acid/iron(III) complexes, diethylenetriaminepentaacetic acid/iron(III) complexes and persulfates are especially preferred, from the viewpoint of rapid processability and the prevention of environmental pollution. The ethylenediaminetetraacetic acid/iron(III) complexes can be used either in an independent bleaching solution or in a combined bleach-fixing solution bath and are especially useful.

A bleaching promoter can be added to the bleaching solution or bleach-fixing solution or to a previous bath, if desired. Examples of useful bleaching promoters are the mercapto group- or disulfide group-containing compounds described in U.S. Pat. No. 3,893,858, West German Pat. Nos. 1,290,812 and 2,059,988, Japanese Patent Application (OPI) Nos. 32736/78, 57831/78, 37418/78, 65732/78, 72623/78, 95630/78, 95631/78, 104232/78, 124424/78, 141623/78 and 28426/78, *Research Disclosure* 17129 (July, 1978), etc.; the thiazolidine derivatives described in Japanese Patent Application (OPI) No. 140129/75; the thiourea derivatives described in Japanese Patent Publication No. 8506/70, Japanese Patent Application (OPI) Nos. 20832/77 and 32735/78, U.S. Pat. No. 3,706,561, etc.; the iodides described in West German Pat. No. 1,127,715 and Japanese Patent Application (OPI) No. 16235/83; the polyethylene oxides described in West German Pat. Nos. 966,410 and 2,748,430, etc.; the polyamine compounds described in Japanese Patent Publication No. 8836/70; and the compounds described in Japanese Patent Application (OPI) Nos. 42434/74, 59644/74, 94927/78, 35727/79, 26506/80 and 163940/83, and iodide ions and bromide ions. In particular, the mercapto group- or disulfide group-containing compounds are preferred from the viewpoint of the high promoting effect, and especially the compounds described in U.S. Pat. No. 3,893,858, West German Pat. No. 1,290,812 and Japanese Patent Application (OPI) No. 95630/78 are more preferred. In addition, the compounds described in U.S. Pat. No. 4,552,834 are also preferred. These bleaching promoters can be added to photographic light-sensitive materials. In particular, these are especially effective when used for bleach-fixing of color photographic materials for picture taking.

As the fixing agent, there may be mentioned thiosulfates, thiocyanates, thioether series compounds, thioureas and a large amount of iodide(s). The use of thiosulfates is generally practiced. As a preservative for the bleach-fixing solution or fixing solution, preferred are sulfites, bisulfites or carbonyl-bisulfite adducts.

After the bleach-fixing or fixing, the photographic light-sensitive materials are generally rinsed with water or stabilized. Various known compounds can be added to the water rinsing bath or stabilization bath for the purpose of prevention of sedimentation or of economization of water. For example, for the purpose of prevention of sedimentation, there can be used a water softener such as inorganic phosphoric acids, amino-polycarboxylic acids, organic amino-polyphosphonic acids, organic phosphoric acids, etc.; a bactericide or fungicide for preventing the propagation of various kinds of bacteria, algae or fungi; a metal salt such as magnesium salts, aluminum salts or bismuth salts; a surfactant for preventing drying load or uneveness; and various kinds of hardeners can be added, in accordance with the necessity of these additives. The compounds described in L. E. West, *Photographic Science and Engineering*, Vol. 6, pages 344 to 359 (1965) can also be added. In particular, the addition of the chelating agent and a fungicide is effective.

Generally, the water rinsing step is carried out in a countercurrent system comprising two or more rinsing tanks for economization of water. In place of the water rinsing step, a multi-stage countercurrent stabilization step, as described in Japanese Patent Application (OPI) No. 8543/82, can also be carried out. This stabilization step requires two to nine countercurrent bathes. Various other compounds than the above mentioned additives can be added to the stabilization bathes for the purpose of stabilization of the images formed. For example, typical examples of the compounds are various kinds of buffers for adjusting the film pH (for example, to pH 3 to 9), such as boric acid salts, metaboric acid salts, borax, phosphoric acid salts, carbonic acid salts, potassium hydroxide, sodium hydroxide, aqueous ammonia, monocarboxylic acids, dicarboxylic acids and polycarboxylic acids which are used in proper combination, as well as aldehydes such as formaldehyde. In addition, various other kinds of additives can also be added, if desired, including a chelating agent, such as inorganic phosphoric acid salts, amino-polycarboxylic acids, organic phosphoric acids, organic phosphoric acids, amino-polyphosphonic acids, phosphonocarboxylic acids, etc.; a fungicide, such as benzisothiazolinone, isothiazolone, 4-thiazolinebenzimidazole, halogenated phenols, sulfanylamide, benzotriazole, etc.; a surfactant, a brightening agent, a hardener, etc. These can be used as a combination of two or more of the same kind of compounds or two or more of different kinds of compounds.

As a film pH-adjusting agent for adjusting the pH value of the film after processing various kinds of ammonium salts, such as ammonium chloride, ammonium nitrate, ammonium sulfate, ammonium phosphate, ammonium sulfite, ammonium thiosulfate, etc., are preferably added.

For processing of color photographic materials for picture taking, a conventional rinsing-stabilization step after the fixation can be replaced by the above mentioned stabilization and rinsing step (for water economization). In this procedure, when the magenta coupler used is 2-equivalent, the formalin in the stabilization bath can be omitted.

The water rinsing and stabilization time for the processing of the photographic light-sensitive materials of the present invention is, although depending upon the kinds of the materials and the processing conditions, generally from 20 seconds to 10 minutes, and preferably from 20 seconds to 5 minutes.

The silver halide color photographic materials of the present invention can contain a color developing agent for the purpose of simplification and acceleration of the processing of the materials. For the incorporation of the agent into the materials, various kinds of precursors of color developing agents are preferably used. As the precursors, there may be mentioned, for example, the indoaniline series compounds as described in U.S. Pat. No. 3,342,597; the Shiff base type compounds as described in U.S. Pat. No. 3,342,599 and *Research Disclosures* 14850 and 15159; the aldole compounds as described *Research Disclosures* 13924; the metal complexes as described in U.S. Pat. No. 3,719,492; the urethane series compounds as described in Japanese Patent Application (OPI) No. 135628/78; and other various kinds of salt type precursors as described in Japanese Patent Application (OPI) Nos. 6253/81, 16133/81, 59232/81, 67842/81, 83734/81, 83735/81, 83736/81, 89735/81, 81837/81, 54430/81, 106241/81, 107236/81, 97531/82, and 83565/82.

The silver halide color photographic materials of the present invention can contain, if necessary, various kinds of 1-phenyl-3-pyrazolidones for the purpose of promoting color development. Typical examples of the compounds are described in Japanese Patent Application (OPI) Nos. 64339/81, 144547/82, 211147/82, 50532/83, 50536/83, 50533/83, 50534/83, 50535/83 and 115438/83, etc.

The processing solutions for processing the materials of the present invention are generally used at a temperature of from 10° C. to 50° C. Although a temperature of from 33° C. to 38° C. is standard, the temperature may be made higher so as to shorten the processing time, or on the contrary, may be made lower so as to improve the image quality of the images formed or to improve the stability of the processing solutions used. In addition, a cobalt intensifier or a hydrogen peroxide intensifier, as described in West German Pat. No. 2,226,770 and U.S. Pat. No. 3,674,499 can also be used for the purpose of economization of silver in the photographic light-sensitive materials.

If desired, each processing tank may be equipped with a heater, a temperature sensor, a liquid level sensor, a circulating pump, a filter, a floating lid, a squeegee, etc.

When the materials are processed continuously, a replenisher is added to each processing bath to prevent fluctuation of the liquid composition in the bath, whereby a constant finish can be attained. The amount of the replenisher may be reduced to a half or less of the standard amount for reduction of the processing cost.

With reference to the FIGS. 1 to 3, the parts of the unit of the present invention will be explained below. (1) is a unit body, (2) is a unit body base, (2a) is an opening of the unit body base, (3) is a backboard, (4) is a photographic lens, (5) is a finder window, (6) is a release button, (8) is a reelin-up nob, (10) is an exposure frame, (11) is a film roll chamber, (11a) is an opening of the film roll chamber, (12) is a patrone chamber, (12a) is an opening of the, patrone chamber, (14) is a reelin-up fork, (15) is a film-supporting plane, (16) is a sprocket, (20) is a patrone, (21) is a non-exposed film, (22) is a reeling shaft, (22a) is a slit, (23) is a roll film, (25) is a grip arm, (26) is a stretched film part, (27) is a holding plate, (28) is a patrone shaft, (30) is a film-controlling plane, (32) is a step, (35) is a shutter, (37) is a broken groove, (38) is a projection.

The constitution of the unit as mentioned above is described in detail in the examples (pages 8 to 16) of Japanese Patent Application No. 246978/86.

The following examples are intended to illustrate the present invention but not to limit it in any way.

EXAMPLE 1

Color negative films (1), (2) and (3) each having an ISO sensitivity of 400 were prepared as mentioned below. The support used was one to which a curling property had previously been imparted by the method as described in Japanese Patent Publication No. 26582/79, and this had an absolute curling value and a fluctuating value as shown in Table 1 below.

Layer Structure (1)

Layer Structure (1) comprised the following plural layers in which the amount of each component coated is represented by g/m², the silver halide is represented by g/m² as the amount of silver, and the sensitizing dye is represented by mol per mol of silver halide in the same layer.

| First Layer: Anti-halation Layer | |
|---|---|
| Black Colloidal Silver | 0.2 |
| Gelatin | 1.4 |
| UV-1 | 0.02 |
| UV-2 | 0.04 |
| UV-3 | 0.04 |
| Solv-1 | 0.05 |
| Second Layer: Interlayer | |
| Fine silver bromide grains (mean grain size 0.07μ) | 0.08 |
| Gelatin | 1.1 |
| ExC-1 | 0.02 |
| ExM-1 | 0.06 |
| UV-1 | 0.03 |
| UV-2 | 0.06 |
| UV-3 | 0.07 |
| Cpd-1 | 0.1 |
| ExF-1 | 0.004 |
| Solv-1 | 0.1 |
| Solv-2 | 0.09 |
| Third Layer: Low Sensitive Red-sensitive Emulsion Layer | |
| Silver iodobromide emulsion (AgI 6.3 mol %, AgI rich interior type, grain diameter as the corresponding sphere 0.8μ, variation coefficient of the sphere corresponding grain size 25%, tabular grains, aspect ratio of diameter/thickness 2) | 1.5 as Ag |
| Gelatin | 1.7 |
| ExC-2 | 0.3 |
| ExC-3 | 0.02 |
| ExS-1 | $7.1 \times 10^{-5}$ |
| ExS-2 | $1.9 \times 10^{-5}$ |
| ExS-3 | $2.4 \times 10^{-4}$ |
| ExS-4 | $4.2 \times 10^{-5}$ |
| Solv-2 | 0.03 |
| Fourth Layer: Medium Sensitive Red-sensitive Emulsion Layer | |
| Silver iodobromide emulsion (AgI 4.8 mol %, AgI rich interior type, grain diameter as the corresponding sphere 0.9μ, variation coefficient of the sphere corresponding grain size 50%, tabular grains, aspect ratio of diameter/thickness 1.5) | 1.4 as Ag |
| Gelatin | 2.1 |
| ExC-2 | 0.4 |
| ExC-3 | 0.002 |
| ExS-1 | $5.2 \times 10^{-5}$ |
| ExS-2 | $1.4 \times 10^{-5}$ |
| ExS-3 | $1.8 \times 10^{-4}$ |
| ExS-4 | $3.1 \times 10^{-5}$ |
| Solv-2 | 0.5 |
| Fifth Layer: High Sensitive Red-sensitive Emulsion Layer | |
| Silver iodobromide emulsion (AgI 10.2 mol %, AgI rich interior type, grain diameter as the corresponding sphere 1.2μ, variation coefficient of the sphere corresponding grain size 35%, tabular grains, aspect ratio of diameter/thickness 3.5) | 2.1 as Ag |
| Gelatin | 2.0 |
| ExC-1 | 0.06 |
| ExC-4 | 0.04 |
| ExC-5 | 0.2 |
| ExS-1 | $6.5 \times 10^{-5}$ |
| ExS-2 | $1.7 \times 10^{-5}$ |
| ExS-3 | $2.2 \times 10^{-4}$ |
| ExS-4 | $3.8 \times 10^{-4}$ |
| Solv-1 | 0.1 |
| Solv-2 | 0.3 |
| Sixth Layer: Interlayer | |
| Gelatin | 1.1 |
| Seventh Layer: Low Sensitive Green-sensitive Emulsion Layer | |
| Silver iodobromide emulsion (AgI 6.3 mol %, AgI rich interior type, grain diameter as the corresponding sphere 0.8μ, variation coefficient of the sphere corresponding grain size 25%, tabular grains, aspect ratio of diameter/thickness 2) | 0.6 as Ag |
| Gelatin | 0.8 |
| ExM-2 | 0.3 |
| ExM-1 | 0.03 |
| ExM-3 | 0.05 |
| ExY-2 | 0.04 |
| ExS-5 | $3.1 \times 10^{-5}$ |
| ExS-6 | $1.0 \times 10^{-4}$ |
| ExS-7 | $3.8 \times 10^{-4}$ |
| H-1 | 0.04 |
| H-2 | 0.01 |
| Solv-2 | 0.2 |
| Eighth Layer: Middle Sensitive Green-sensitive Emulsion Layer | |
| Silver iodobromide emulsion (AgI 4.8 mol %, AgI rich interior type, grain diameter as the corresponding sphere 0.9μ, variation coefficient of the sphere corresponding grain size 50%, tabular grains, aspect ratio of diameter/thickness 1.5) | 1.1 as Ag |
| Gelatin | 1.4 |
| ExM-4 | 0.2 |
| ExM-5 | 0.05 |
| ExM-1 | 0.01 |
| ExM-3 | 0.01 |
| ExY-2 | 0.02 |
| ExS-5 | $2.0 \times 10^{-5}$ |
| ExS-6 | $7.0 \times 10^{-5}$ |
| ExS-7 | $2.6 \times 10^{-4}$ |
| H-1 | 0.07 |
| H-2 | 0.02 |
| Solv-1 | 0.06 |
| Solv-2 | 0.4 |
| Ninth Layer: High Sensitive Green-sensitive Emulsion Layer | |
| Silver Iodobromide Emulsion (AgI 10.2 mol %, AgI rich interior type, grain diameter as the corresponding sphere 1.2μ, variation coefficient of the sphere corresponding grain size 38%, tabular grains, aspect ratio of diameter/thickness 4) | 2.1 as Ag |
| Gelatin | 2.2 |
| ExC-2 | 0.02 |
| ExM-5 | 0.1 |
| ExM-1 | 0.05 |
| ExS-5 | $3.5 \times 10^{-5}$ |
| ExS-6 | $8.0 \times 10^{-5}$ |
| ExS-7 | $3.0 \times 10^{-4}$ |
| Solv-1 | 0.08 |
| Solv-2 | 0.7 |
| Tenth Layer: Yellow Filter Layer | |
| Yellow Colloidal Silver | 0.05 |
| Gelatin | 1.0 |
| Cpd-1 | 0.1 |
| Eleventh Layer: Low Sensitive Blue-sensitive Emulsion Layer | |
| Silver iodobromide emulsion (AgI 9.0 mol %, AgI rich interior type, grain diameter as the corresponding sphere 0.75μ, variation coefficient of the sphere corresponding grain size 21%, octahedral grains, aspect ratio of diameter/thickness 1) | 0.3 as Ag |
| Gelatin | 1.3 |
| ExY-1 | 0.7 |
| ExY-2 | 0.03 |
| H-1 | 0.03 |
| H-2 | 0.01 |
| Solv-2 | 0.3 |
| Twelfth Layer: Medium Sensitive Blue-sensitive Emulsion Layer | |
| Silver iodobromide emulsion (AgI 10.2 mol %, AgI rich interior type, grain diameter as the corresponding sphere 1.0μ, variation coefficient of the sphere corresponding grain size 30%, tabular grains, aspect ratio of diameter/thickness 3.5) | 0.4 as Ag |
| Gelatin | 0.7 |
| ExY-2 | 0.1 |
| ExS-8 | $2.2 \times 10^{-4}$ |
| H-1 | 0.01 |

| | |
|---|---|
| H-2 | 0.005 |
| Solv-2 | 0.05 |
| Thirteenth Layer: High Sensitive Blue-sensitive Emulsion Layer | |
| Silver iodobromide emulsion (AgI 9.8 mol %, AgI rich interior type, grain diameter as the corresponding sphere 1.8μ, variation coefficient of the sphere corresponding grain size 55%, tabular grains, aspect ratio of diameter/thickness 4.5) | 0.8 as Ag |
| Gelatin | 0.7 |
| ExY-1 | 0.2 |
| ExS-8 | $2.3 \times 10^{-4}$ |
| Solv-2 | 0.07 |
| Fourteenth Layer: First Protective Layer | |
| Gelatin | 0.9 |

| | |
|---|---|
| UV-4 | 0.1 |
| UV-5 | 0.2 |
| H-1 | 0.02 |
| H-2 | 0.005 |
| Solv-3 | 0.03 |
| Cpd-2 | 0.7 |
| Fifteenth Layer: Second Protective Layer | |
| Fine silver bromide grains (mean grain size 0.07μ) | 0.1 |
| Gelatin | 0.7 |
| H-1 | 0.2 |
| H-2 | 0.05 |

The compounds used in the above-mentioned layers were as follows:

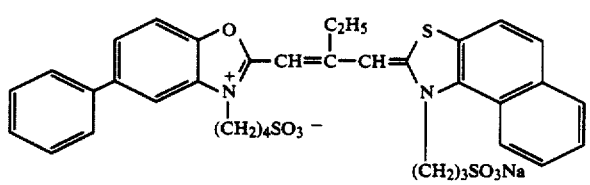
ExS-1

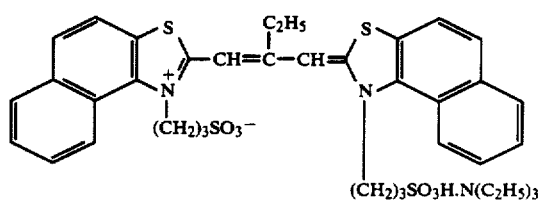
ExS-2

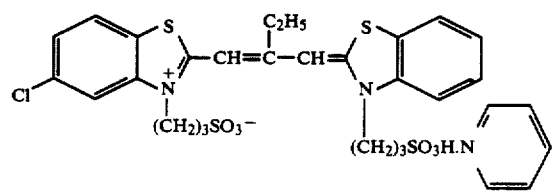
ExS-3

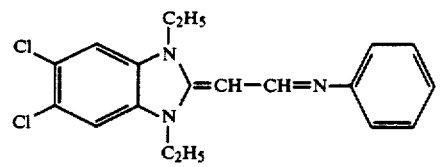
ExS-4

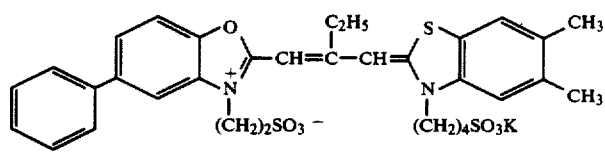
ExS-5

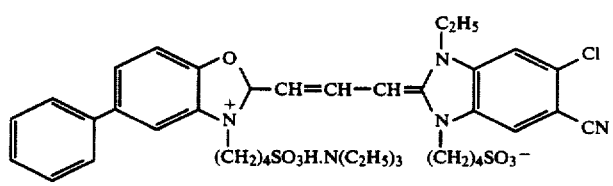
ExS-6

-continued
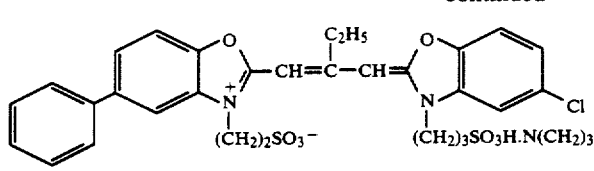
ExS-7
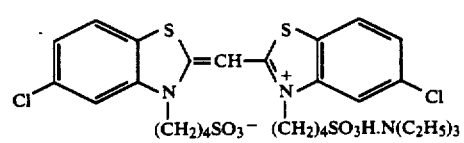
ExS-8
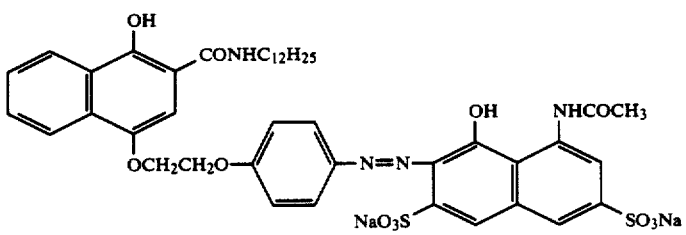
ExC-1
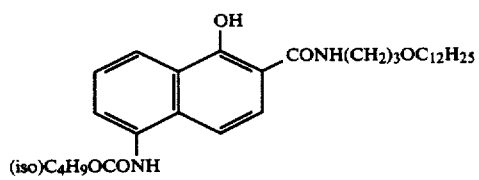
ExC-2
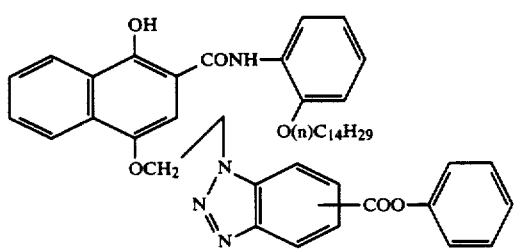
ExC-3
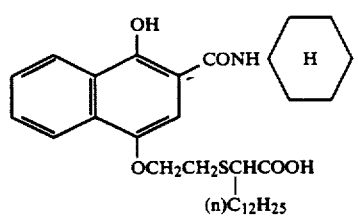
ExC-4
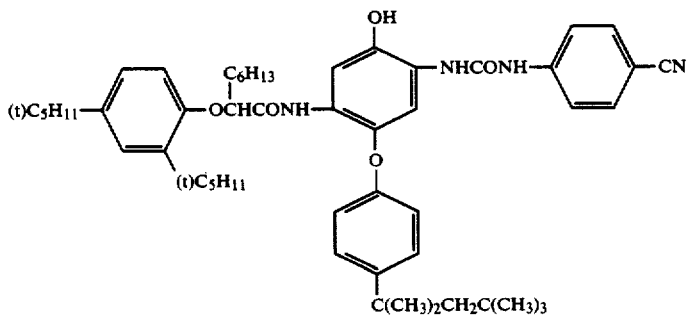
ExC-5

-continued
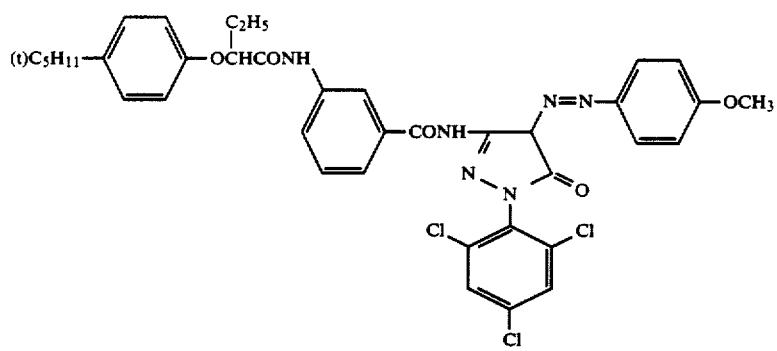
ExM-1
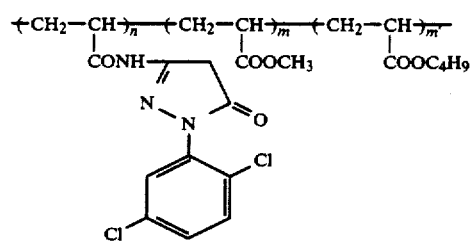
ExM-2
n/m + m' = 1
m/m' = 1
(molecular weight: about 40,000)
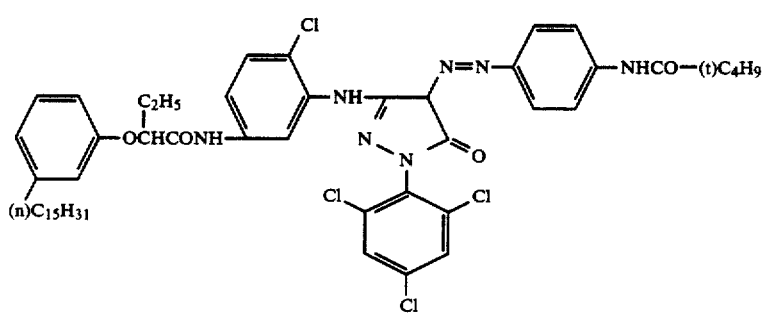
ExM-3
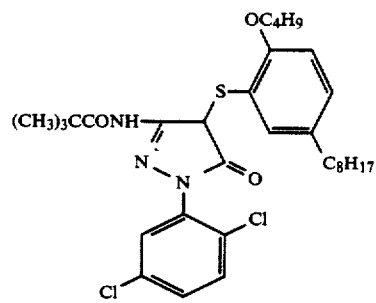
ExM-4
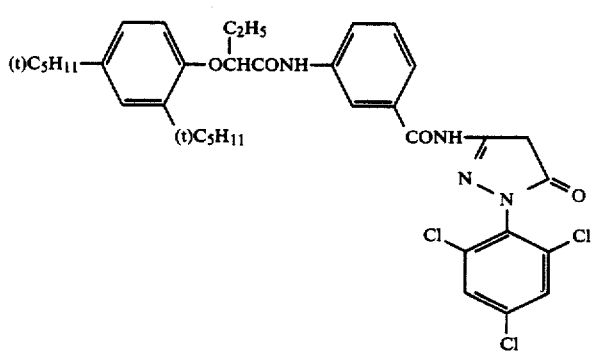
ExM-5

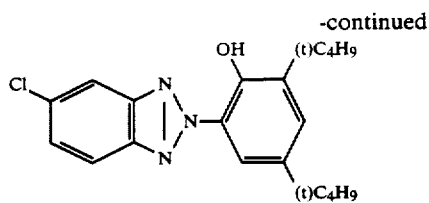 UV-1
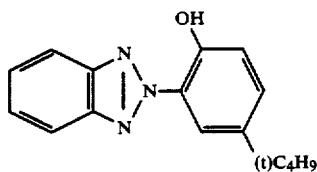 UV-2
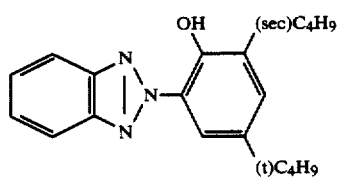 UV-3
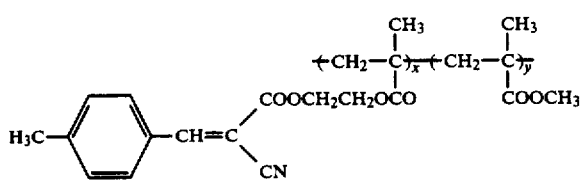 UV-4
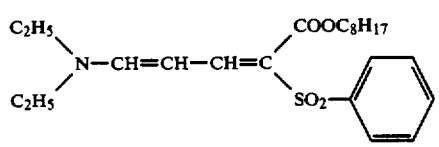 UV-5
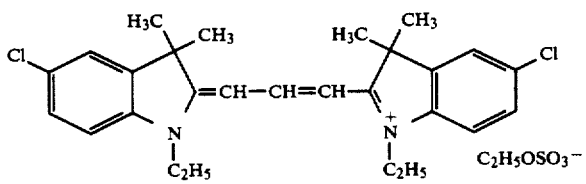 ExF-1
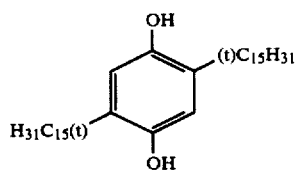 Cpd-1
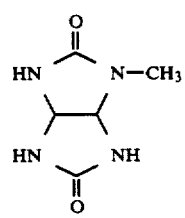 Cpd-2
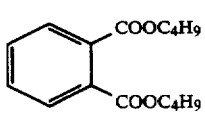 Solv-1

-continued

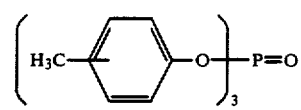 Solv-2

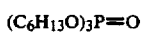 Solv-3

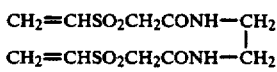 H-1

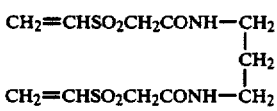 H-2

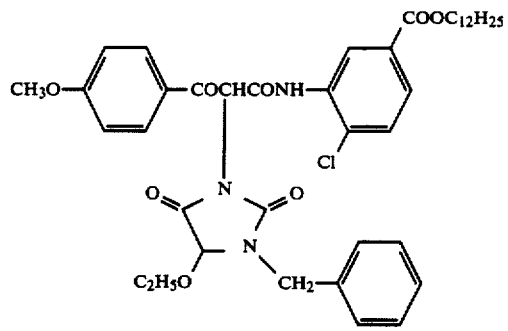 ExY-1

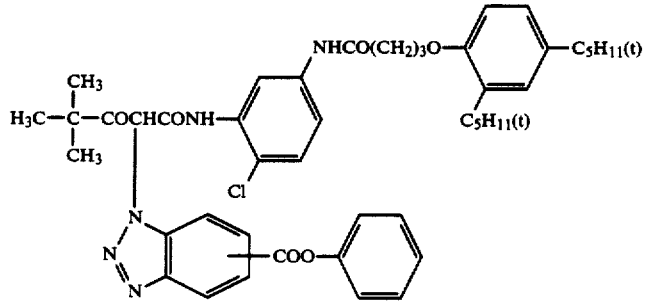 ExY-2

Layer Structure (2)

Layer structure (2) was same as Layer Structure (1), except at the following points.

In the 11th layer, the gelatin amount was varied to 1.6, and Solv-2 to 0.15; in the 12th layer, the gelatin amount was varied to 1.0; in the 13th layer, the gelatin amount was varied to 1.0; and in the 14th layer, the gelatin amount was varied to 1.5 and Cpd-2 to 0.3.

Layer Structure (3)

Layer Structure (3) was the same as Layer Structure (2), except at the following point.

The gelatin amount in the 15th layer was varied to 2.7.

Preparation of Samples (101) to (103)

Layer Structure (1) was applied to a support by the method described in Japanese Patent Publication No. 26582/79, so that the curling absolute value (after coating) would be 1.0 at a humidity of 50%, 60% or 70%. The fluctuating value of the curling was varied in each sample, and the results were as shown in Table 1.

Preparation of Samples (104) to (106)

In the same manner as above, Samples (104) to (106) as shown in Table 1 were prepared, using Layer Structure (2).

Preparation of Sample (107)

Using Layer Structure (3) in the same manner as mentioned above, Sample (107) was prepared, which had a curling value of 1.0 at a humidity of 60%.

Preparation of Samples (108) to (113)

Using the Layer Structure (1) in the same manner as mentioned above, Samples (108) to (113) were prepared, which had a curling absolute value (humidity 60%) as shown in Table 1.

These film samples were processed into 135-format 24-exposures containing patrones and incorporated into the lens-combined film unit of FIG. 2. The parts of these packed film units were assembled using screws and, therefore, the units showed poor moisture-proofness. These units were put in an atmosphere of 25° C. and 50% RH, 60% RH or 70% RH for 76 hours so that the moisture of the unit and that of the film contained therein was equilibrated in each case. Afterwards, the units were packaged into a moisture-proof bag. The plate to form scratches thereon. The effects of the present invention is also apparent from these results.

TABLE 1

| Sample | Humidity in Package (%) | Curling (mm) Absolute Value | Curling (mm) Fluctuating Value | Decrease of Sensitivity after 7 days at 40° C. (%) | In-focus Object (m) 1st Exposure | In-focus Object (m) 12th Exposure | In-focus Object (m) 24th Exposure | Degree of Scratching of the Back Surface of the Film |
|---|---|---|---|---|---|---|---|---|
| 101 (Invention) | 50 | 1.0 | 1.4 | 5 | 3 | 3 | 3 | small |
| 102 (Invention) | 60 | 1.0 | 1.0 | 15 | 3 | 3 | 3 | small |
| 103 (Comparison) | 70 | 1.0 | 0.6 | 33 | 3 | 3 | 3 | small |
| 104 (Comparison) | 50 | 1.0 | 2.5 | 5 | 3 | 5 | 6 | small |
| 105 (Comparison) | 60 | 1.0 | 1.6 | 15 | 3 | 4 | 5 | small |
| 106 (Comparison) | 70 | 1.0 | 0.9 | 33 | 3 | 3 | 3 | small |
| 107 (Comparison) | 60 | 1.0 | 2.0 | 15 | 3 | 5 | 8 | small |
| 108 (Comparison) | 60 | 1.5 | 1.1 | 15 | 3–8 | 5–10 | 5–zero | small |
| 109 (Invention) | 60 | 1.0 | 1.0 | 15 | 3 | 3 | 4 | small |
| 110 (Invention) | 60 | 0 | 0.9 | 15 | 3 | 3 | 3 | small |
| 111 (Invention) | 60 | 0.5 | 1.0 | 15 | 3 | 3 | 3 | small |
| 112 (Invention) | 60 | 1.5 | 1.0 | 15 | 3 | 3 | 3 | small |
| 113 (Comparison) | 60 | 2.0 | 0.9 | 15 | 3 | 3 | 3 | great | units were made so that the focus point was 3 m at the said humidity. The storability of these units for 7 days at 40° C. was tested. In addition, at every three minutes for one hour after the bag was broken and the units were taken removed therefrom, a resolving power chart which was positioned at every one meter over a distance of from 1 to 10 m was photographed with the units, and the distance of the focus point of each unit was checked. The results obtained are shown in Table 1, in which the results of 1st, 12th and 24th exposures are shown as typical examples.

The result indicated that the sensitivity of the film was apt to decrease with the elevation of the humidity in the package of the packed film unit, and therefore it can be understood that the film should be packed into the unit at a low humidity of from 50 to 60%.

On the other hand, in the case that the packed unit was opened at a temperature of 25° C. and a humidity of 80% and used for picture-taking, the films as packed into the unit under high humidity conditions were found better since the focus point during the picture-taking of 1st to 24th exposures was constant.

When the film samples had a fluctuating value of curling which fell within the claimed scope, the sensitivity thereof did not decrease even under high humidity conditions, and, in addition, the variation of the focus point was small so as to be 1 m or so after the passage of time even when the package of the film unit was opened at a temperature of 25° C. and a humidity of 80%. The effects of the present invention are seen to be quite remarkable from these results.

Moreover, if the absolute value of the curling is less than −1.5 mm or more than 2.0 mm, the focus point would sometimes noticeable vary, or the back side of the film would sometimes be rubbed by the holding

EXAMPLE 2

Samples (201) to (213) were prepared in the same manner as Samples (101) to (113) in Example 1, except for the following variations.

Different from Example 1, the lens-combined film packed units of present Example 2 were made by hot-fusion of the parts, and, therefore, the moisture-proofness of the unit was sufficient. Using these moisture-proof units, the storability of the films therein were tested for 7 days at 40° C. In addition, at every about three minutes for one hour a resolving power chart which was positioned at every one meter at a distance of from 1 to 10 m was photographed with the units under the conditions of a temperature of 25° C. and a humidity of 80%, and the object distance of the focus point of each unit was checked. The results obtained are shown in Table 2 below, in which the results of 1st, 12th and 24th exposure are shown as typical examples.

The results indicate that the sensitivity of the film is apt to decrease with an elevation of the humidity in the packed unit, and, therefore, it can be understood that the film is to be packed into the unit at a low humidity of from 50 to 60%. In addition, the claimed unit formed by hot-fusion of the parts proved to be able to form good photographs with no fluctuation of the focus point even when the same was used for picture-taking under high humidity conditions. The present lens-combined film packed unit with moisture-proofness proved to be free from fluctuation in the focus point thereof, although the curling property of the film in the unit depended on the ambient temperature. In addition, the results of Table 2 prove that the focus point of units which are outside the scope of the present invention may often go wrong or the films of such units are often scratched, and, therefore, the effect of the units of the present invention is noticeable.

TABLE 2

| Sample | Humidity in Package (%) | Curling (mm) Absolute Value | Curling (mm) Fluctuating Value | Decrease of Sensitivity after 7 days at 40° C. (%) | In-focus Object (m) 1st Exposure | In-focus Object (m) 12th Exposure | In-focus Object (m) 24th Exposure | Degree of Scratching of the Back Surface of the Film |
|---|---|---|---|---|---|---|---|---|
| 201 (Invention) | 50 | 1.0 | 1.4 | 4 | 3 | 3 | 3 | small |
| 202 (Invention) | 60 | 1.0 | 1.0 | 12 | 3 | 3 | 3 | small |
| 203 (Comparison) | 70 | 1.0 | 0.6 | 35 | 3 | 3 | 3 | small |
| 204 (Invention) | 50 | 1.0 | 2.5 | 4 | 3 | 3 | 3 | small |
| 205 (Invention) | 60 | 1.0 | 1.6 | 12 | 3 | 3 | 3 | small |
| 206 (Comparison) | 70 | 1.0 | 0.9 | 35 | 3 | 3 | 3 | small |
| 207 (Invention) | 60 | 1.0 | 2.0 | 12 | 3 | 3 | 3 | small |
| 208 (Comparison) | 60 | 1.5 | 1.1 | 12 | 3–8 | 3–8 | 3–8 | small |
| 209 (Invention) | 60 | 1.0 | 1.0 | 12 | 3 | 3 | 3 | small |
| 210 (Invention) | 60 | 0 | 0.9 | 12 | 3 | 3 | 3 | small |
| 211 (Invention) | 60 | 0.5 | 1.0 | 12 | 3 | 3 | 3 | small |
| 212 (Invention) | 60 | 1.5 | 1.0 | 12 | 3 | 3 | 3 | small |
| 213 (Comparison) | 60 | 2.0 | 0.9 | 12 | 3 | 3 | 3 | great |

EXAMPLE 3

In the same manner as Example 1, color negative films (4) and (5) having an ISO sensitivity of 1600 were prepared by the method given below. The film was incorporated into a film unit in the same manner as in Example 1 and packaged at a humidity of from 50% to 70% to obtain samples (301) to (306). These were tested in the same manner as earlier described. The results obtained are shown in table 3 below.

Layer Structure (4)

Layer Structure (4) comprised the following plural layers in which the amounts of the silver halide and colloidal silver are represented as units of g/m² as silver, the amount of coupler is represented by g/m² and the amount of the sensitizing dye is represented by as units of mol per mol of the silver halide in the same layer.

| First Layer: Anti-halation Layer | |
|---|---|
| Black Colloidal Silver | 0.2 as Ag |
| Gelatin | 2.2 |
| UV-1 (Ultraviolet Absorbent) | 0.1 |
| UV-2 (Ultraviolet Absorbent) | 0.2 |
| Cpd-1 | 0.05 |
| Solv-1 (Dispersing Oil for UV-1, UV-2) | 0.01 |
| Solv-2 (Dispersing Oil for UV-1, UV-2) | 0.01 |
| Solv-3 (Dispersing Oil for Cpd-1) | 0.08 |
| Second Layer: Interlayer | |
| Fine silver halide grains (AgBr with mean grain size of 0.07μ) | 0.15 as Ag |
| Gelatin | 1.0 |
| Cpd-2 (Color Mixing Preventing Agent) | 0.2 |
| Third Layer: First Red-sensitive Emulsion Layer | |
| Silver iodobromide emulsion (AgI 10.0 mol %, AgI-rich interior type, grain diameter as the corresponding sphere 0.8μ, variation coefficient of the sphere corresponding grain size 28%, tabular grains, aspect ratio of diameter/thickness 3.0) | 0.7 as Ag |
| Silver iodobromide emulsion (AgI 6.0 mol %, AgI-rich interior type, grain diameter as the corresponding sphere 0.5μ, variation coefficient of the sphere corresponding grain size 26%, tabular grains, aspect ratio of diameter/thickness 3.0) | 0.5 as Ag |
| Gelatin | 2.0 |
| ExS-1 (Sensitizing Dye) | $4.5 \times 10^{-4}$ mol |
| ExS-4 (Sensitizing Dye) | $0.3 \times 10^{-4}$ mol |
| ExS-2 (Sensitizing Dye) | $1.5 \times 10^{-4}$ mol |
| ExS-3 (Sensitizing Dye) | $0.4 \times 10^{-4}$ mol |
| ExC-1 (Coupler) | 0.55 |
| ExC-2 (DIR Coupler) | 0.01 |
| ExC-3 (Colored Coupler) | 0.03 |
| Solv-1 (Dispersing Oil for ExC-1, 2, 3) | 0.2 |
| Solv-3 (Dispersing Oil for ExC-1, 2, 3) | 0.2 |
| Fourth Layer: Second Red-sensitive Emulsion Layer | |
| Silver iodobromide emulsion (AgI 10.0 mol %, AgI rich interior type, grain diameter as the corresponding sphere 1.0μ, variation coefficient of the sphere corresponding grain size 30%, tabular grains, aspect ratio of diameter/thickness 4.0) | 1.0 as Ag |
| Gelatin | 1.3 |
| ExS-1 (Sensitizing Dye) | $3 \times 10^{-4}$ |
| ExS-2 (Sensitizing Dye) | $1 \times 10^{-4}$ |
| ExS-3 (Sensitizing Dye) | $0.3 \times 10^{-4}$ |
| ExS-4 (Sensitizing Dye) | $0.3 \times 10^{-4}$ |
| ExC-1 (Coupler) | 0.09 |
| ExC-3 (Colored Coupler) | 0.06 |
| ExC-4 (Coupler) | 0.12 |
| Solv-1 (Dispersing Oil for ExC-1, 3, 4) | 0.12 |
| Solv-2 (Dispersing Oil ExC-1, 3, 4) | 0.12 |
| Fifth Layer: Third Red-sensitive Emulsion Layer | |
| Silver iodobromide emulsion (AgI 10.0 mol %, AgI rich interior type, grain diameter as the corresponding sphere 1.5μ, variation coefficient of the sphere corresponding grain size 32%, tabular grains, aspect ratio of diameter/thickness 6.0) | 1.3 as Ag |
| Gelatin | 1.2 |
| ExS-1 (Sensitizing Dye) | $2 \times 10^{-4}$ |
| ExS-2 (Sensitizing Dye) | $0.6 \times 10^{-4}$ |

-continued

| | |
|---|---|
| ExS-3 (Sensitizing Dye) | $0.2 \times 10^{-4}$ |
| ExC-5 (Coupler) | 0.07 |
| ExC-4 (Coupler) | 0.08 |
| Solv-1 (Dispersing Oil for ExC-4, 5) | 0.12 |
| Solv-2 (Dispersing Oil for ExC-4, 5) | 0.12 |
| Sixth Layer: Interlayer | |
| Gelatin | 1.3 |
| Cpd-4 (Color Mixing Preventing Agent) | 0.2 |
| Seventh Layer: | |
| First Green-sensitive Emulsion Layer | |
| Silver iodobromide emulsion (AgI 10.0 mol %, AgI rich interior type, grain diameter as the corresponding sphere 0.8μ, variation coefficient of the sphere corresponding grain size 28%, tabular grains, aspect ratio of diameter/thickness 3.0) | 0.2 as Ag |
| Silver iodobromide emulsion (AgI 6.0 mol %, AgI rich interior type, grain diameter as the corresponding sphere 0.5μ, variation coefficient of the sphere corresponding grain size 26%, tabular grains, aspect ratio of diameter/thickness 3.0) | 0.1 as Ag |
| Gelatin | 1.4 |
| ExS-5 (Sensitizing Dye) | $5 \times 10^{-4}$ |
| ExS-6 (Sensitizing Dye) | $2 \times 10^{-4}$ |
| ExS-7 (Sensitizing Dye) | $1 \times 10^{-4}$ |
| ExM-1 (Coupler) | 0.48 |
| ExM-2 (DIR Coupler) | 0.06 |
| ExM-5 (Colored Coupler) | 0.06 |
| Solv-1 (Dispersing Oil for ExM-1, 2, 5) | 0.2 |
| Eighth Layer: | |
| Second Green-sensitive Emulsion Layer | |
| Silver iodobromide emulsion (AgI 10.0 mol %, I-rich interior type, grain diameter as the corresponding sphere 0.85μ, variation coefficient of the sphere corresponding grain size 28%, tabular grains, aspect ratio of diameter/thickness 3.0) | 0.6 as Ag |
| Gelatin | 0.5 |
| ExS-5 (Sensitizing Dye) | $3.5 \times 10^{-4}$ |
| ExS-6 (Sensitizing Dye) | $1.4 \times 10^{-4}$ |
| ExS-7 (Sensitizing Dye) | $0.7 \times 10^{-4}$ |
| ExM-1 (Coupler) | 0.25 |
| ExM-3 (Colored Coupler) | 0.05 |
| Solv-1 (Dispersing Oil for ExM-1, 3) | 0.15 |
| Ninth Layer: Interlayer | |
| Gelatin | 0.5 |
| Tenth Layer: | |
| Third Green-sensitive Emulsion Layer | |
| Silver iodobromide emulsion (AgI 10.0 mol %, AgI rich interior type, grain diameter as the corresponding sphere 1.5μ, variation coefficient of the sphere corresponding grain size 32%, tabular grains, aspect ratio of diameter/thickness 6.0) | 1.3 as Ag |
| Gelatin | 1.4 |
| ExS-5 (Sensitizing Dye) | $2 \times 10^{-4}$ |
| ExS-6 (Sensitizing Dye) | $0.8 \times 10^{-4}$ |
| ExS-7 (Sensitizing Dye) | $0.8 \times 10^{-4}$ |
| ExM-4 (Coupler) | 0.15 |
| ExM-1 (Colored Coupler) | 0.03 |
| ExC-4 | 0.005 |
| Solv-1 (Dispersing Oil ExM-4, 1, ExC-4) | 0.2 |
| Eleventh Layer: Yellow Filter Layer | |
| Cpd-3 (Dye) | 0.05 |
| Gelatin | 0.5 |
| Solv-1 (Dispersing Oil for Cpd-3) | 0.1 |

-continued

| | |
|---|---|
| Twelfth Layer: Interlayer | |
| Gelatin | 0.5 |
| Cpd-2 | 0.1 |
| Thirteenth Layer: | |
| First Blue-sensitive Emulsion Layer | |
| Silver iodobromide emulsion (AgI 8.5 mol %, I-rich interior type, grain diameter as the corresponding sphere 0.7μ, variation coefficient of the sphere corresponding grain size 21%, octahedral grains) | 0.2 as Ag |
| Silver iodobromide emulsion (AgI 3.0 mol %, I-rich interior type, grain diameter as the corresponding sphere 0.3μ, variation coefficient of the sphere corresponding grain size 22%, octahedral grains) | 0.1 as Ag |
| Gelatin | 1.2 |
| ExS-8 (Sensitizing Dye) | $3 \times 10^{-4}$ |
| ExY-1 (Coupler) | 0.7 |
| ExY-2 (DIR Coupler) | 0.03 |
| Solv-1 (Dispersing Oil for ExY-1, 2) | 0.5 |
| Fourteenth Layer: | |
| Second Blue-sensitive Emulsion Layer | |
| Silver iodobromide emulsion (AgI 10.0 mol %, AgI rich interior type, grain diameter as the corresponding sphere 1.0μ, variation coefficient of the sphere corresponding grain size 30%, tabular grains, aspect ratio of diameter/thickness 4.0) | 0.4 as Ag |
| Gelatin | 0.3 |
| ExS-8 (Sensitizing Dye) | $2 \times 10^{-4}$ |
| ExY-1 (Coupler) | 0.3 |
| Solv-1 (Dispersing Oil for ExY-1) | 0.2 |
| Fifteenth Layer: Interlayer | |
| Fine silver iodobromide grains (AgI 2 mol %, uniform type, grain diameter as the corresponding sphere 0.13μ) | 0.4 as Ag |
| Gelatin | 0.36 |
| Sixteenth Layer: | |
| Third Blue-sensitive Emulsion Layer | |
| Silver iodobromide emulsion (AgI 14.0 mol %, AgI rich interior type, grain diameter as the corresponding sphere 2.1μ, variation coefficient of the sphere corresponding grain size 30%, tabular grains, aspect ratio of diameter/thickness 5.0) | 1.4 as Ag |
| Gelatin | 1.1 |
| ExS-8 (Sensitizing Dye) | $1.5 \times 10^{-4}$ |
| ExY-1 (Coupler) | 0.2 |
| Solv-1 (Dispersing Oil ExY-1) | 0.14 |
| Seventeenth Layer: First Protective Layer | |
| Gelatin | 1.8 |
| UV-1 (Ultraviolet Absorbent) | 0.1 |
| UV-2 (Ultraviolet Absorbent) | 0.2 |
| Solv-1 (Dispersing Oil for UV-1, 2) | 0.01 |
| Solv-2 (Dispersing Oil for UV-1, 2) | 0.01 |
| Eighteenth Layer: Second Protective Layer | |
| Fine silver halide grains (AgBr with a mean grain size of 0.07μ) | 0.3 as Ag |
| Gelatin | 0.7 |
| Polymethyl methacrylate grains (diameter 1.5μ) | 0.2 |
| W-1 (Static Charge Adjusting Agent) | 0.02 |
| H-1 (Hardener) | 0.4 |
| Cpd-5 (Formaldehyde Scavenger) | 1.0 |

The compounds used in the above-mentioned layers were as follows:

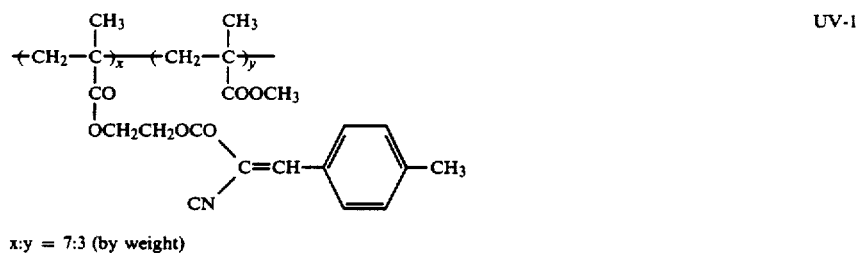
UV-1
x:y = 7:3 (by weight)
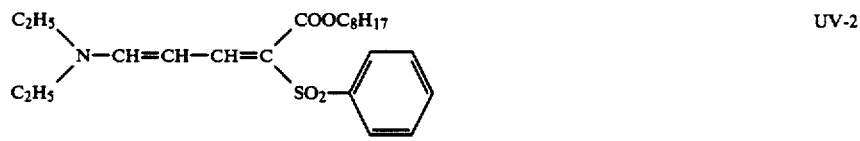
UV-2
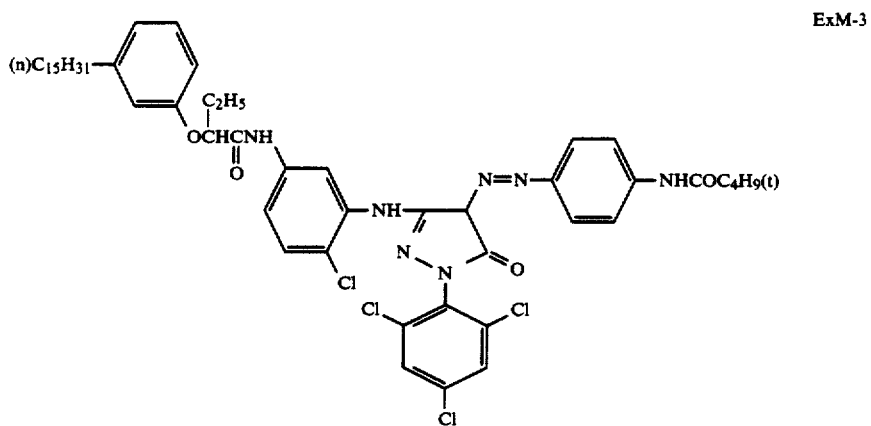
ExM-3
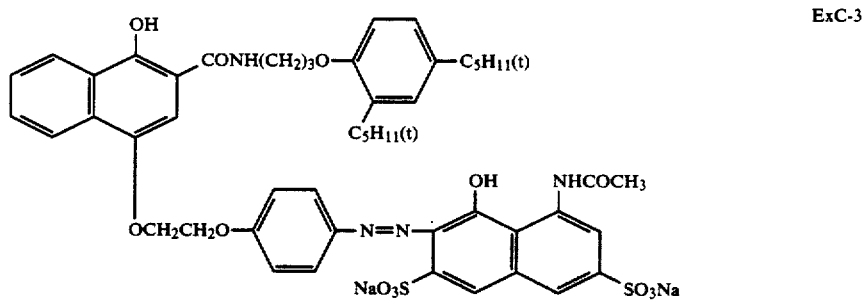
ExC-3
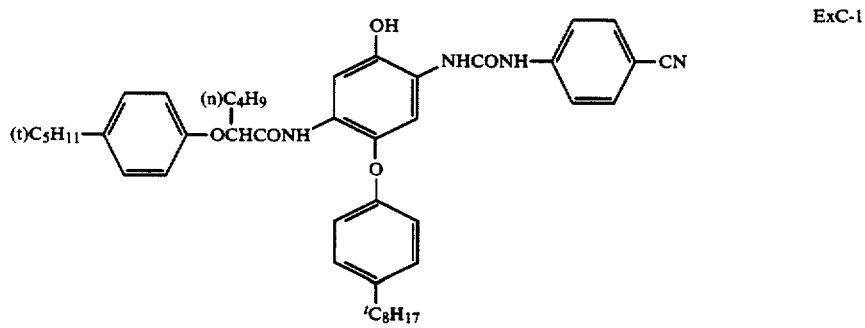
ExC-1

-continued
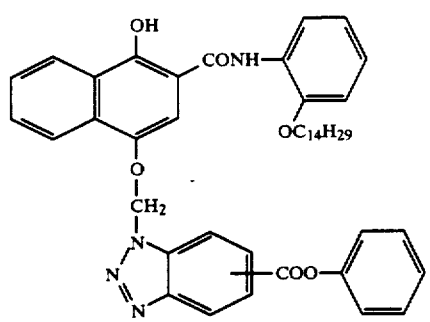
ExC-2
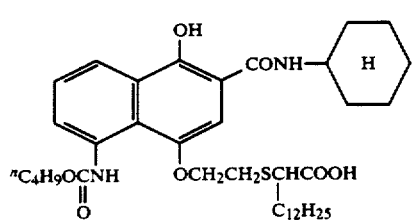
ExC-4
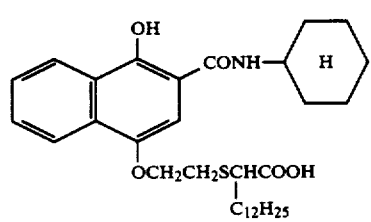
ExC-5
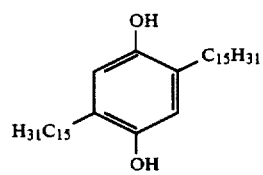
Cpd-2
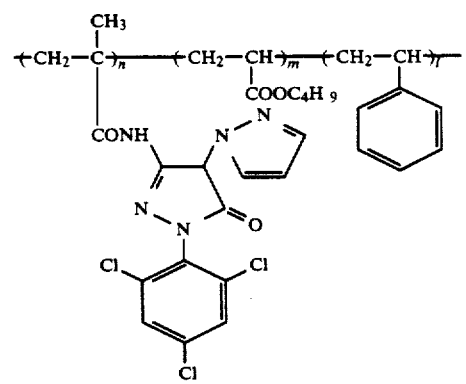
ExM-1
n:m:l = 2:1:1 (by weight) Mean Molecular Weight 40,000

-continued
ExM-2
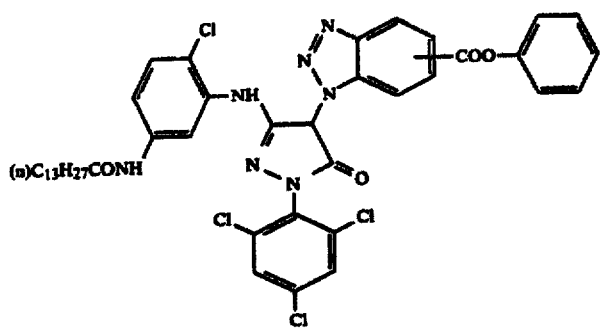
ExM-4
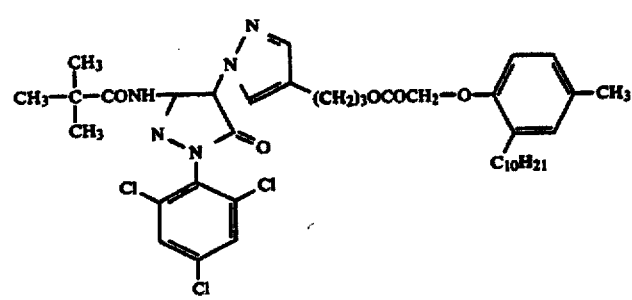
ExM-5
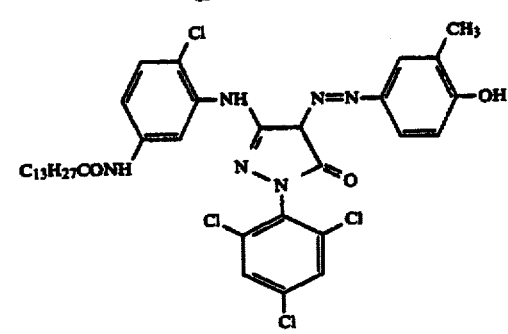
ExY-1
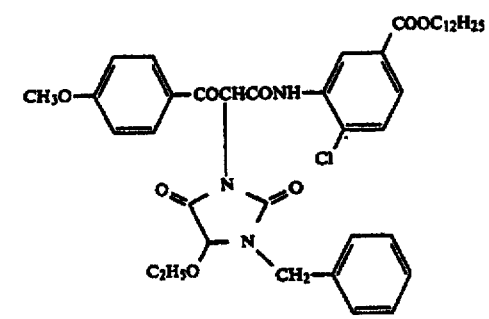
ExY-2
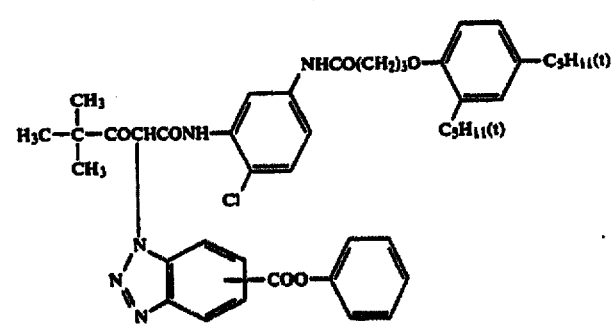

-continued
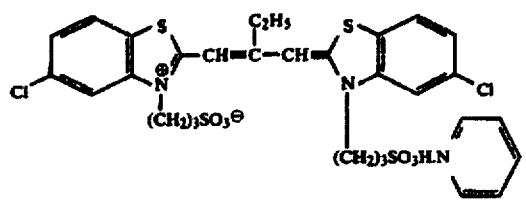
ExS-1
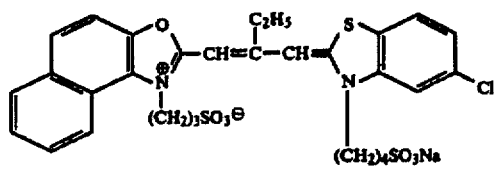
ExS-2
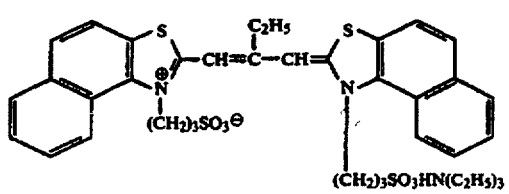
ExS-3
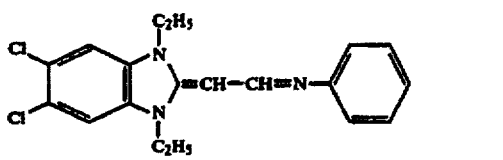
ExS-4
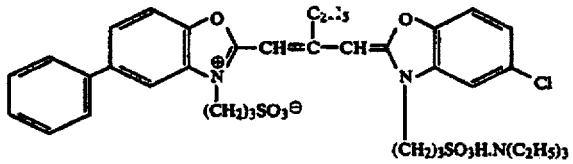
ExS-5
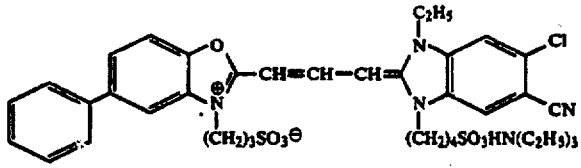
ExS-6
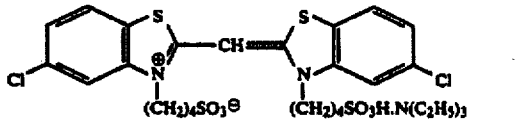
ExS-8
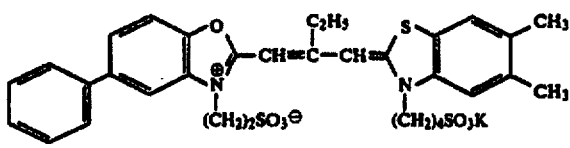
ExS-7
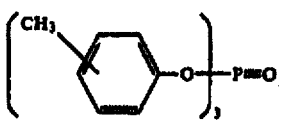
Solv-1

-continued

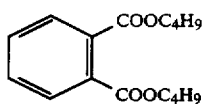 Solv-2

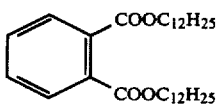 Solv-3

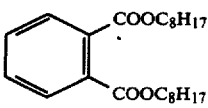 Solv-4

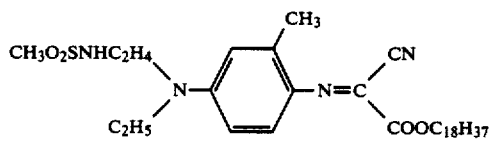 Cpd-1

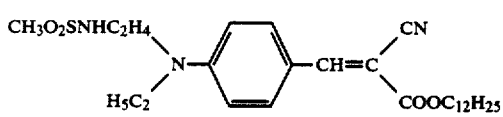 Cpd-3

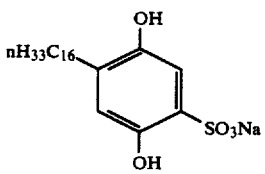 Cpd-4

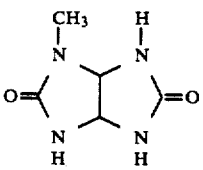 Cpd-5

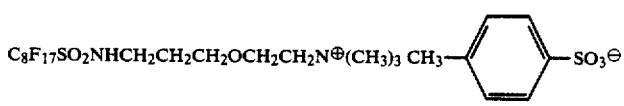 W-1

$C_8F_{17}SO_2NHCH_2CH_2CH_2OCH_2CH_2N^{\oplus}(CH_3)_3$  $CH_3$—⟨⟩—$SO_3^{\ominus}$

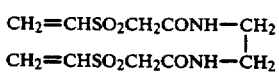 H-1

$CH_2=CHSO_2CH_2CONH-CH_2$
$CH_2=CHSO_2CH_2CONH-CH_2$

The results indicate that the sensitivity of the film is apt to decrease with an elevation of the humidity in the packed unit, and therefore it can be understood that the film is to be packed into the unit at a low humidity of from 50 to 60%.

On the other hand, in the case where the package of the packed unit was opened at a temperature of 25° C. and a humidity of 80% and used for picture taking, the films as packed into the unit under high humidity conditions were found to be better since the focus point during the picture taking of the 1st to 24th exposures was constant.

When the film has a fluctuating value of the curling which falls within the scope of the present invention and the film packed unit is stored under conditions of a low humidity, the sensitivity of the film does not decrease even when it is kept at a high temperature and the fluctuation of the focus point is small even when the package is opened under conditions of a temperature of 25° C. and a humidity of 80%. Accordingly, the effect of the present invention is apparent from the results.

TABLE 3

| Sample | Humidity in Package (%) | Curling (mm) | | Decrease of Sensitivity after 7 days at 40° C. (%) | In-focus Object (m) | | | Degree of Scratching of the Back Surface of the Film |
| | | Absolute Value | Fluctuating Value | | 1st Exposure | 12th Exposure | 24th Exposure | |
| --- | --- | --- | --- | --- | --- | --- | --- | --- |
| 301 | 50 | 1.0 | 1.5 | 7 | 3 | 3 | 4 | small |

TABLE 3-continued

| Sample | Humidity in Package (%) | Curling (mm) Absolute Value | Curling (mm) Fluctuating Value | Decrease of Sensitivity after 7 days at 40° C. (%) | In-focus Object (m) 1st Exposure | In-focus Object (m) 12th Exposure | In-focus Object (m) 24th Exposure | Degree of Scratching of the Back Surface of the Film |
|---|---|---|---|---|---|---|---|---|
| (Invention) 302 | 60 | 1.0 | 1.1 | 18 | 3 | 3 | 3 | small |
| (Invention) 303 | 70 | 1.0 | 0.7 | 45 | 3 | 3 | 3 | small |
| (Comparison) 304 | 50 | 1.0 | 2.7 | 7 | 3 | 4 | 6 | small |
| (Comparison) 305 | 60 | 1.0 | 2.0 | 18 | 3 | 4 | 5 | small |
| (Comparison) 306 (Comparison) | 70 | 1.0 | 1.3 | 45 | 3 | 3 | 4 | small |

EXAMPLE 4

Samples (402) to (404) were prepared in the same manner as for the preparation of Sample (101) of Example 1 except for the following variations.

The emulsion grains of the 12th layer of Sample (101) were replaced by those as described in Japanese Patent Application (OPI) No. 143331/85 to obtain Sample (402), whereupon the sensitivity of the two samples was made same. Also, the same grains were replaced by the grains as described in Japanese Patent Application (OPI) No. 113934/83 to obtain Sample (403), whereupon the sensitivity of the two samples was also made same.

Further, the same grains were replaced by the grains as prepared by the following.

Preparation for Sample 404

In 4 liter capacity of reactor for preparation of silver halide emulsion according to a conventional double jet manner, 1350 ml of water, 17 g of gelatin and 3.7 g of KBr were dissolved and a solution of pH 6.0 was adjusted using 1N of KOH solution. To the solution at 45° C., 67.7 ml of AgNO$_3$ solution (0.90 mol/l) and 67.7 ml of aqueous solution containing KBr (0.85 mol/l) and KI (0.09 mol/l) were simultaneously added by a predetermined same amount for 45 sec. and stirred for 5 min. and standed to cool. The mixed solution was elevated to 65° and 241 g of 10% aqueous gelatin solution was added thereto and standed to cool. (the first stage addition)

Nest, to the obtained solution, 655 ml of 1.76 mol/l Ag NO$_3$ solution and a solution containing 2.72 mol/l KBr and 0.28 mol/l KI were added with accelerating the flow rate (finally so as to be as twice as the first rate) for 60 min. in a double jet manner. (the second stage addition)

Physical reopening was conducted with washing twice the resulting solution with phthalated gelatin, adding 0.55 l of 10% bone gelatin, and adjusting pH and pBr of the emulsion to 5.5 and 3.1, respectively.

Further, chemical ripening was conducted using potassium tetrachloroaurate, sodium thiosulfate and sodium thiocyanate to obtain Sample (404), whereupon the sensitivity of the two samples was made same.

Next, Samples (405) to (408) were prepared in the same manner as Samples (101) and (402) to (404), respectively, except that the humidity was varied to 60%.

24 prints obtained from each of the above mentioned film Samples (101) and (402) to (408) were inspected in detail, and, as a result, the number of scratched exposures caused by pressure marks was as shown in Table 4 below. The results of Table 4 indicate that two-layered grains and tabular grains with a low aspect ratio can advantageously be used in the photographic light-sensitive materials of the packed units of the present invention because of the small pressure marks under conditions of low humidity.

TABLE 4

| Sample | Emulsion Grains in 12th Layer | Humidity in Packed Unit (%) | Number of Scratched Exposures (%) |
|---|---|---|---|
| 101 | Spherical uniform iodine grains | 50 | 15 |
| 402 | Spherical two-layered grains | 50 | 10 |
| 403 | Tabular uniform iodine grains with an aspect ratio of 20 | 50 | 20 |
| 404 | Tabular uniform iodine grains with an aspect ratio of 5 | 50 | 13 |
| 405 | Spherical uniform iodine grains | 60 | 12 |
| 406 | Spherical two-layered grains | 60 | 8 |
| 407 | Tabular uniform iodine grains with an aspect ratio of 20 | 60 | 17 |
| 408 | Tabular uniform iodine grains with an aspect ration of 5 | 60 | 10 |

While the invention has been described in detail and with reference to specific embodiments thereof, it will be apparent to one skilled in the art that various changes and modifications can be made therein without departing from the spirit and scope thereof.

What is claimed is:

1. A photographic light-sensitive material-packed unit for picture-taking, comprising:
    a photographic light-sensitive material having at least one cyan-coloring red-sensitive silver halide emulsion layer, at least one magenta-coloring green-sensitive silver halide emulsion layer and at least one yellow-coloring blue-sensitive silver halide emulsion layer on a support;
    a lens-combined picture-taking unit including exposure means, said photographic light-sensitive material being incorporated within said unit;
    wherein the size of a picture plane of the said light-sensitive material within said unit is 3.0 cm$^2$ or more, the packed unit is further packaged with a moisture-proof bag, a relative humidity in the said moisture-proof bag is 65% or less at 25° C., and that an absolute value of the curling of the said light-sensitive material is from −1 mm to +1.5 mm at said relative humidity while a fluctuation value of the curling thereof is 1.5 mm or less.

2. A photographic light-sensitive material-packed unit for picture-taking, comprising:
    a photographic light-sensitive material having at least one cyan-coloring red-sensitive silver halide emulsion layer, at least one magenta-coloring green-sensitive silver halide emulsion layer and at least one yellow-coloring blue-sensitive silver halide emulsion layer on a support;

a lens-combined picture-taking unit including exposure means;

wherein the size of a picture plane of said lightsensitive material is 3.0 cm² or more, a relative humidity in the said lens-combined unit pack is 65% or less at 25° C., an absolute value of a curling of said light-sensitive material is from −1 mm to +1.5 mm at said relative humidity, and said lens-combined pack unit body is made of a moisture-impermeable material and parts of said body are joined by thermal fusion so that the body may be moisture-impermeable.

3. A photographic light-sensitive material-packed unit as in claim 2, wherein the thermal fusion is effected with ultrasonic waves.

4. A photographic light-sensitive material-packed unit as in claim 1, wherein the photographing object lens has an F value of more than 4.

5. A photographic light-sensitive material-packed unit as in claim 1, wherein the photographing object lens has an F value of more than 8 and less than 16.

6. A photographic light-sensitive material-packed unit as in claim 1, wherein the relative humidity in the packed unit is 60% or less.

7. A photographic light-sensitive material-packed unit as in claim 1, wherein the relative humidity in the packed unit is 55% or less.

8. A photographic light-sensitive material-packed unit as in claim 1, wherein the photographic light-sensitive material for picture-taking contains a hydrophilic gelatin as a main binder and the film thickness thereof is 25 μm or less.

9. A photographic light-sensitive material-packed unit as in claim 1, wherein the said photographic light-sensitive material has an ISO sensitivity of 250 or more.

10. A photographic light-sensitive material-packed unit as in claim 1, wherein the said photographic light-sensitive material has an ISO sensitivity of 800 or more.

11. A photographic light-sensitive material-packed unit as in claim 1, wherein the photographing object lens has a focal length of from 30 to 40 mm.

* * * * *